United States Patent [19]
Shinohara

[11] Patent Number: 6,116,310
[45] Date of Patent: Sep. 12, 2000

[54] PNEUMATIC TIRE

[75] Inventor: Kazunori Shinohara, Tokyo, Japan

[73] Assignee: Bridgestone Corporation, Tokyo, Japan

[21] Appl. No.: 08/897,967

[22] Filed: Jul. 23, 1997

[30] Foreign Application Priority Data

Jul. 24, 1996 [JP] Japan ..................... 8-195084

[51] Int. Cl.⁷ .............. B60C 11/11; B60C 11/12; B60C 11/13; B60C 107/00
[52] U.S. Cl. ............... 152/209.21; 152/DIG. 3; 152/902
[58] Field of Search ............ 152/209 R, 209 D, 152/DIG. 3, 209.21, 209.17, 209.18, 902

[56] References Cited

U.S. PATENT DOCUMENTS

| | | | |
|---|---|---|---|
| 4,723,584 | 2/1988 | Yamaguchi et al. | 152/209 R |
| 5,176,765 | 1/1993 | Yamaguchi et al. | 152/209 R |
| 5,385,189 | 1/1995 | Aoki et al. | 152/DIG. 3 |

FOREIGN PATENT DOCUMENTS

| | | | |
|---|---|---|---|
| 0 337 787 | 10/1989 | European Pat. Off. | |
| 564435 | 10/1993 | European Pat. Off. | 152/209 D |
| 61-016112 | 1/1986 | Japan . | |
| 62-241712 | 10/1987 | Japan | 152/DIG. 3 |
| 2-197402 | 8/1990 | Japan | 152/209 R |
| 2-310108 | 12/1990 | Japan | 152/209 D |
| 4-306106 | 10/1992 | Japan . | |
| 4-345504 | 12/1992 | Japan | 152/209 R |
| 5-286313 | 11/1993 | Japan | 152/209.28 |
| 6-1442 | 1/1994 | Japan . | |
| 8-258515 | 10/1996 | Japan . | |
| 1 150 295 | 4/1969 | United Kingdom . | |
| WO 94/21478 | 9/1994 | WIPO . | |

OTHER PUBLICATIONS

Translation for Japan 62–241712.
Translation for Japan 2–310108.

*Primary Examiner*—Steven D. Maki
*Attorney, Agent, or Firm*—Sughrue, Mion, Zinn, Macpeak & Seas, PLLC

[57] ABSTRACT

A pneumatic tire capable of obtaining a high tire performance on ice without decreasing the other performances can be provided. A plurality of narrow grooves each having a rectangular cross section are formed on one sipe side wall surface of a sipe in an inclined manner at a certain angle. Even when the sipe is closed under a load application to the tire, portions having the narrow grooves are not brought into contact with the other sipe side wall surface of the sipe so that water on an ice road surface can be absorbed and removed by the narrow grooves. Further, in the case of the narrow groove in which one end is opened to a road contact surface portion and the other end is opened to a side surface, the absorbed water can be continuously discharged to an outside of a block in serial order so that the water on the ice road surface can be further removed. Since the water removal can be performed without a great number of sipes, a decrease of a block rigidity due to employing a great number of sipes does not occur.

15 Claims, 23 Drawing Sheets

FIG. 9

| | THICKNESS t1 (mm) | RATIO t2/t1 | INTERVAL P1 (mm) | RATIO P2/P1 | INTERVAL BETWEEN SIPES (mm) | ANGLE θ (DEGREE) | DEPTH d OF SIPE (mm) | TOTAL LENGTH / LENGTH OF SIPE WITH WIDTH | BRAKING PERFORMANCE ON ICE | TRACTION PERFORMANCE ON ICE |
|---|---|---|---|---|---|---|---|---|---|---|
| CONVENTIONAL EMBODIMENT | 0.4 | — | — | — | 3 | — | 9.5 | — | 100 | 100 |
| 1st EMBODIMENT | 0.5 | 0.6 | 3 | 0.5 | 3 | 45 | 9.5 | 0.5 | 107 | 107 |
| 2nd EMBODIMENT | 0.5 | 0.6 | 3 | 0.5 | 3 | 45 | 9.5 | 0.5 | 107 | 107 |
| 3rd EMBODIMENT | 0.5 | 0.6 | 3 | 0.5 | 3 | 45 | 9.5 | 0.5 | 112 | 112 |
| 4th EMBODIMENT | 0.5 | 0.6 | 3 | 0.5 | 3 | 0~90 | 9.5 | 0.5 | 110 | 110 |

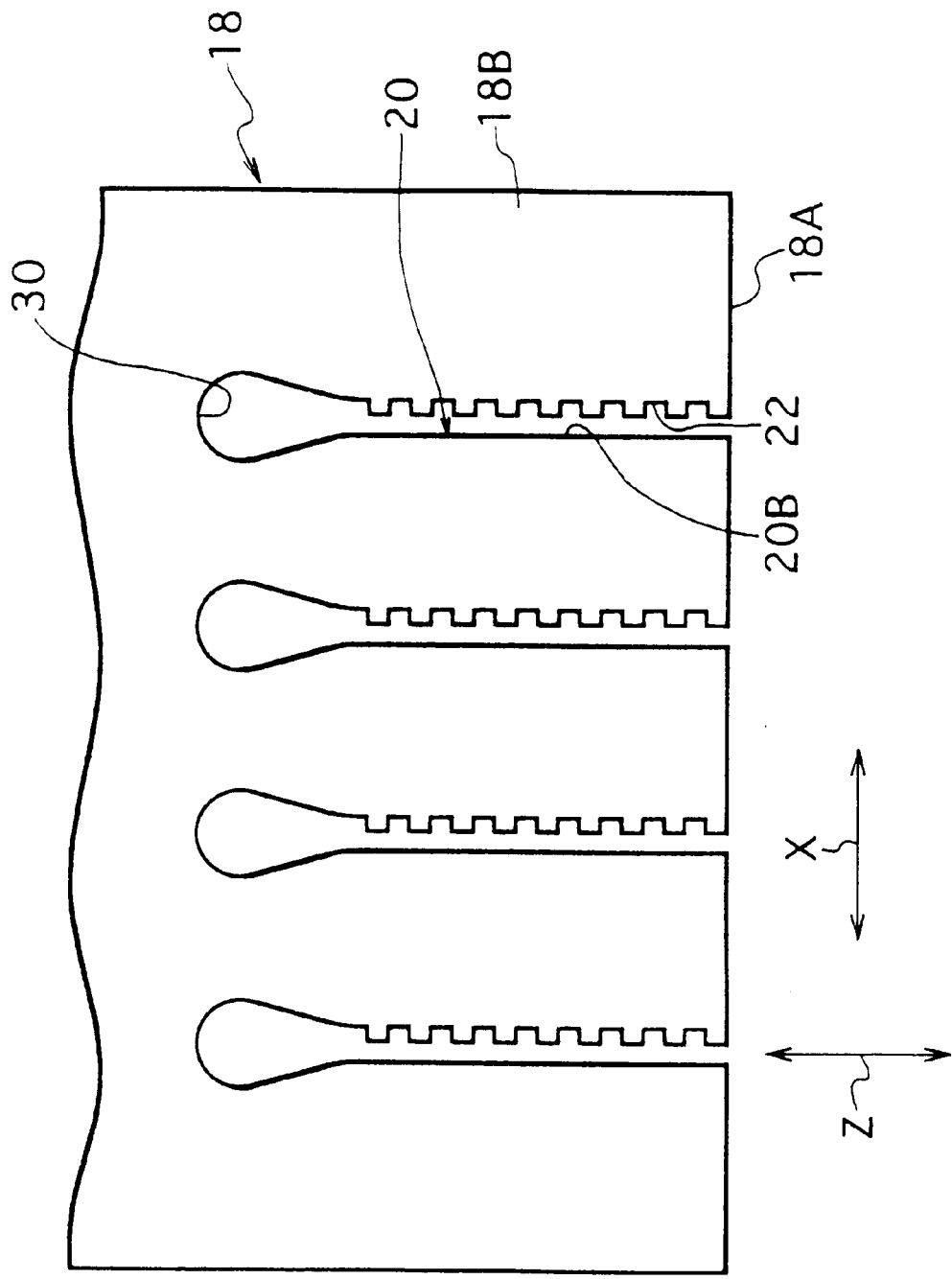

PNEUMATIC TIRE

BACKGROUND OF THE INVENTION

1. Field of the Invention

The present invention relates to a pneumatic tire in which a land portion such as a block, a rib and the like is provided in a tread and a sipe is formed on the land portion, and particularly it relates to a pneumatic tire having an improved tire performance on ice and snow.

2. Description of the Related Art

Because of lowering of coefficient of friction $\mu$ on a frozen road due to mild winters, it is further desired to improve a brake performance on ice of a studless tire.

Generally, a plurality of blocks are formed on a tread of the studless tire and a plurality of sipes are formed on these blocks.

In order to improve a tire performance on ice of the studless tire, the conventional art includes an increase of frictional force by increasing a land contact surface area (a positive surface area) and an improvement of digging up effect by increasing a number (a density) of sipes and increasing an edge component.

Further, on the ice at a temperature close to 0° C., it is known that removing a water film springing out to the road contact surface is important for improving the tire performance on ice.

In order to achieve this, it is effective to increase the density of sipes. However, if the density is increased too much, a volume of the sipe within the land portion is increased due to a thickness of the sipe and a rigidity of the block is lowered so that there is a problem that the road contact surface is decreased.

In order to avoid this problem, it is considered to make the thickness of the sipe thin. However, in accordance with this method, the sipe is closed at a time of receiving a load so that an effect of removing the water film sprung out into the road contact surface is decreased. To mention in detail, as shown in FIGS. 19A and 19B, a block 18 which is not in contact with a road surface has a sipe 20 of a predetermined thickness. When the block 18 is brought into contact with the ice road surface and a load is applied thereto, the block 18 is deformed as shown in FIG. 20B so that the sipe 20 is closed as shown in FIGS. 20A and 20B. Accordingly, an effect of removing a water (a water film) 26 generated on an ice road surface 24 is decreased.

SUMMARY OF THE INVENTION

An object of the present invention is to provide a pneumatic tire capable of obtaining a high tire performance on ice without decreasing the other performances with taking the above fact into consideration.

Inventors of the present invention have paid attention to a shape of a sipe and found a shape of a sipe which can improve an effect of removing a water within a road contact surface by the sipe and improve a tire performance on ice while securing a block edge effect and a block rigidity.

A first aspect in accordance with the present invention is made in view of the above fact and provides a pneumatic tire whose tread comprises a land portion having at least one sipe formed therein, in which a thickness of the sipe is alternately changed between a large size and a small size along a longitudinal direction of the sipe.

Next, an operation of the pneumatic tire in accordance with the first aspect of the present invention will be explained below.

In the pneumatic tire in accordance with the first aspect, since the thickness of the sipe formed on the land portion is alternately changed between a large size and a small size along the longitudinal direction of the sipe, even when the sipe portions having a small thickness are brought into contact with each other to be closed at a time when a load is applied to the tire, the sipe portions having a large thickness are prevented from being contact with each other so that it is possible to remove water between the road contact surface portion and the ice contact surface portion at an amount thereof more.

Further, it is desirable to form the large thickness portion of the sipe such as not to be worn out at least at a time of an end period of abrasion, and it is preferable to form it such as to reach a bottom of the sipe.

Still further, even if the thickness of the sipe is significantly thinned so as to increase a number of the sipes and to secure a rigidity of the block, it is possible to secure a flow passage for always removing a water film because the thickness of the sipe is alternately changed between a large size and a small size.

Furthermore, since water between the road contact surface portion and the ice contact surface portion can be more removed due to the above structure, a rigidity of the land portion is not lowered by using a large number of sipes. In accordance with this, an excess deformation of the land portion can be prevented and a sufficient road contact area and edge component can be secured.

A second aspect in accordance with the present invention provides a pneumatic tire as recited in the first aspect, wherein the large thickness portion of the sipe extends substantially in a linear manner toward the bottom of the sipe.

Next, an operation of the pneumatic tire in accordance with the second aspect of the present invention will be explained below.

In the pneumatic tire in accordance with the second aspect, since the large thickness portion of the sipe extends substantially in a linear manner toward the bottom of the sipe, water between the road contact surface portion and the ice contact surface portion is removed in serial order toward the bottom of the sipe. Moreover, it is possible to limit resistance at a time when the water flows through the large thickness portion.

In this case, a direction to which the large thickness portion extends may be along a normal direction of the tire (a direction 90 degree inclined with respect to the road contact surface portion) or may be inclined with respect to the normal direction of the tire. In this description, a substantially linear shape includes a little curved shape in addition to a completely linear shape.

Further, if the extending direction of the larger thickness portion is inclined with respect to the normal direction of the tire, the large thickness portion having an end formed on the road contact surface portion and the other end open to a side surface of the land portion is formed so that after water between the road contact surface portion and the ice contact surface portion is removed, the water can be discharged from the side surface of the land portion to an outer side of the land portion in serial order.

A third aspect in accordance with the present invention provides a pneumatic tire as recited in the first aspect, wherein the large thickness portion of the sipe extends substantially in a circular arc manner toward the bottom of the sipe.

Next, operation of the pneumatic tire in accordance with the third aspect of the present invention will be explained below.

In the pneumatic tire in accordance with the third aspect, since the large thickness portion of the sipe extends substantially in a circular arc manner toward the bottom of the sipe, water between the road contact surface portion and the ice contact surface portion is removed in a circular arc manner toward the bottom of the sipe in serial order.

In this description, a substantially circular arc shape means a shape in which an extending direction is gradually changed to a predetermined and includes a shape of a part of an oval and a shape of a parabola.

Further, if the large thickness portion extends towards the bottom of the sipe substantially in a circular arc manner, the large thickness portion having an end formed on the road contact surface portion and the other end open to a side surface of the land portion is formed so that the water received from a portion between the road contact surface portion and the ice contact surface portion can be removed from the side surface of the land portion.

A fourth aspect in accordance with the present invention provides a pneumatic tire as recited in any one of the first aspect to the third aspect, wherein a thickness of the large thickness portion of the sipe is set to a range between 0.1 mm and 1.5 mm.

Next, operation of the pneumatic tire in accordance with the fourth aspect of the present invention will be explained below.

In the pneumatic tire in accordance with the fourth aspect, since the thickness of the large thickness portion of the sipe is set to a range between 0.1 mm to 1.5 mm, the water can be efficiently removed. In this case, without this range, effect for removing water is reduced.

A fifth aspect in accordance with the present invention provides a pneumatic tire as recited in any one aspect of the first aspect to the fourth aspect, wherein a thickness of the small thickness portion of the sipe is set to a range between 10% and 80% of the thickness of the large thickness portion.

Next, operation of the pneumatic tire in accordance with the fifth aspect of the present invention will be explained below.

In the pneumatic tire in accordance with the fifth aspect, since the thickness of the small thickness portion of the sipe is set to a range between 10% to 80% of the thickness of the large thickness portion, the water can be efficiently removed. In this case, without this range, effect for removing water is reduced.

A sixth aspect in accordance with the present invention provides a pneumatic tire as recited in any one of the first aspect to the fifth aspect, wherein a total length of the large thickness portion of the sipe in a longitudinal direction of the sipe is set to a range between 20% and 80% of a total length of the sipe.

Next, the operation of the pneumatic tire in accordance with the sixth aspect of the present invention will be explained below.

In the pneumatic tire in accordance with the sixth aspect, since the total length of the large thickness portion of the sipe is set to a range between 20% to 80% of the total length of the sipe, the water can be efficiently removed. In this case, without this range, effect for removing water is reduced.

A seventh aspect in accordance with the present invention provides a pneumatic tire as recited in any one of the first aspect to the sixth aspect, wherein the small thickness portion of the sipe is structured such that under a state contact to the road contact surface at a time of load application, wall surfaces of the sipe opposing to each other are substantially brought into contact with each other and the large thickness portion is structured such that under a state contact to the road contact surface at a time of load application, wall surfaces of the sipe opposing to each other are not substantially brought into contact with each other.

Next, an operation of the pneumatic tire in accordance with the seventh aspect of the present invention will be explained below.

In the pneumatic tire in accordance with the seventh aspect, since the small thickness portion is structured such that under a state contact to the road contact surface at a time of load application, the wall surfaces of the sipe opposing to each other are substantially brought into contact with each other and the large thickness portion is structured such that under a state contact to the road contact surface at a time of load application, the wall surfaces of the sipe opposing to each other are not substantially brought into contact with each other, the water can be efficiently removed by the large thickness portion.

An eighth aspect in accordance with the present invention provides a pneumatic tire as recited in any one of the first aspect to the seventh aspect, wherein an interval of the large thickness portion of the sipe is set to a range between 0.1 mm and 5.0 mm.

Next, the operation of the pneumatic tire in accordance with the eighth aspect of the present invention will be explained below.

In the pneumatic tire in accordance with the eighth aspect, since the interval of the large thickness portion is set to a range between 0.1 mm and 5.0 mm, the water can be efficiently removed. In this case, without this range, effect for removing water is reduced.

A ninth aspect in accordance with the present invention provides a pneumatic tire as recited in any one of the first aspect to the eighth aspect, wherein the large thickness portion of the sipe is structured by a first groove shaped recess portion formed on one sipe wall surface of the sipe and a second groove shaped recess portion formed on the other sipe wall surface, and the first groove shaped recess portion and the second groove shaped recess portion are closed to each other.

Next, the operation of the pneumatic tire in accordance with the ninth aspect of the present invention will be explained below.

In the pneumatic tire in accordance with the ninth aspect, the water is removed by the first groove shaped recess portion and the second groove shaped recess portion. Since the first groove shaped recess portion and the second groove shaped recess portion are closed to each other, if ends of the first groove shaped recess portion and the second groove shaped recess portion are open to the side surface of the land portion, the water can be discharged to both side surfaces of the land portion, that is, main grooves provided both the side defining the land portion.

A tenth aspect in accordance with the present invention provides a pneumatic tire as recited in any one of the first aspect to the ninth aspect, wherein the sipe includes an enlarged portion having a shape of a flask on an end in a depth direction thereof.

Next, the operation of the pneumatic tire in accordance with the tenth aspect of the present invention will be explained below.

In the pneumatic tire in accordance with the tenth aspect, since the sipe has the enlarged portion having a shape of a flask on the end in the depth direction thereof, it is possible to discharge all the removed water to the side of the land portion through the enlarged portion.

An eleventh aspect in accordance with the present invention provides a pneumatic tire as recited in any one of the first aspect to the tenth aspect, wherein the sipe has one end which opens to the side wall of the land portion and the other end which terminates within the land portion, the other end including an enlarged portion.

Next, the operation of the pneumatic tire in accordance with the eleventh aspect of the present invention will be explained below.

In the pneumatic tire in accordance with the eleventh aspect, water between the road contact surface portion and the ice road surface can be removed. Further, since the sipe does not completely cross the land portion, deterioration in the rigidity of the land portion can be prevented so that generation of an unbalanced abrasion can be prevented. Further, since a stress given to the other end of the sipe can be dispersed in the enlarged portion, generation of a crack in the other end can be prevented.

A twelfth aspect in accordance with the present invention provides a pneumatic tire as recited in the eleventh aspect, wherein an enlarged portion formed in the end of the sipe in the depth direction thereof is connected to the enlarged portion formed in the other end of the sipe.

Next, the operation of the pneumatic tire in accordance with the twelfth aspect of the present invention will be explained below.

In the pneumatic tire in accordance with the twelfth aspect, water absorbed by the enlarged portion provided in the other end of the sipe can be discharged out of the land portion through the enlarged portion provided in the bottom of the sipe. In the pneumatic tire, the enlarged portion has a depth which is greater than the width of each large thickness portion.

The above and other objects, features and advantages of the present invention will become apparent from the following description and the appended claims, taken in conjunction with the accompanying drawings in which preferred embodiments of the present invention are shown by way of illustrative example.

BRIEF DESCRIPTION OF THE DRAWINGS

The invention will now be described with reference to the accompanying drawings wherein:

FIG. 9 is a table diagram which shows size parameters of the sipe and test results;

FIG. 21 is a side elevational view which shows a block of a pneumatic tire in accordance with further embodiment of the present invention;

DETAILED DESCRIPTION OF THE PREFERRED EMBODIMENTS

First Embodiment

An embodiment of a pneumatic tire in accordance with the present invention will be explained below with reference to FIGS. 1 to 9.

Figure 1:
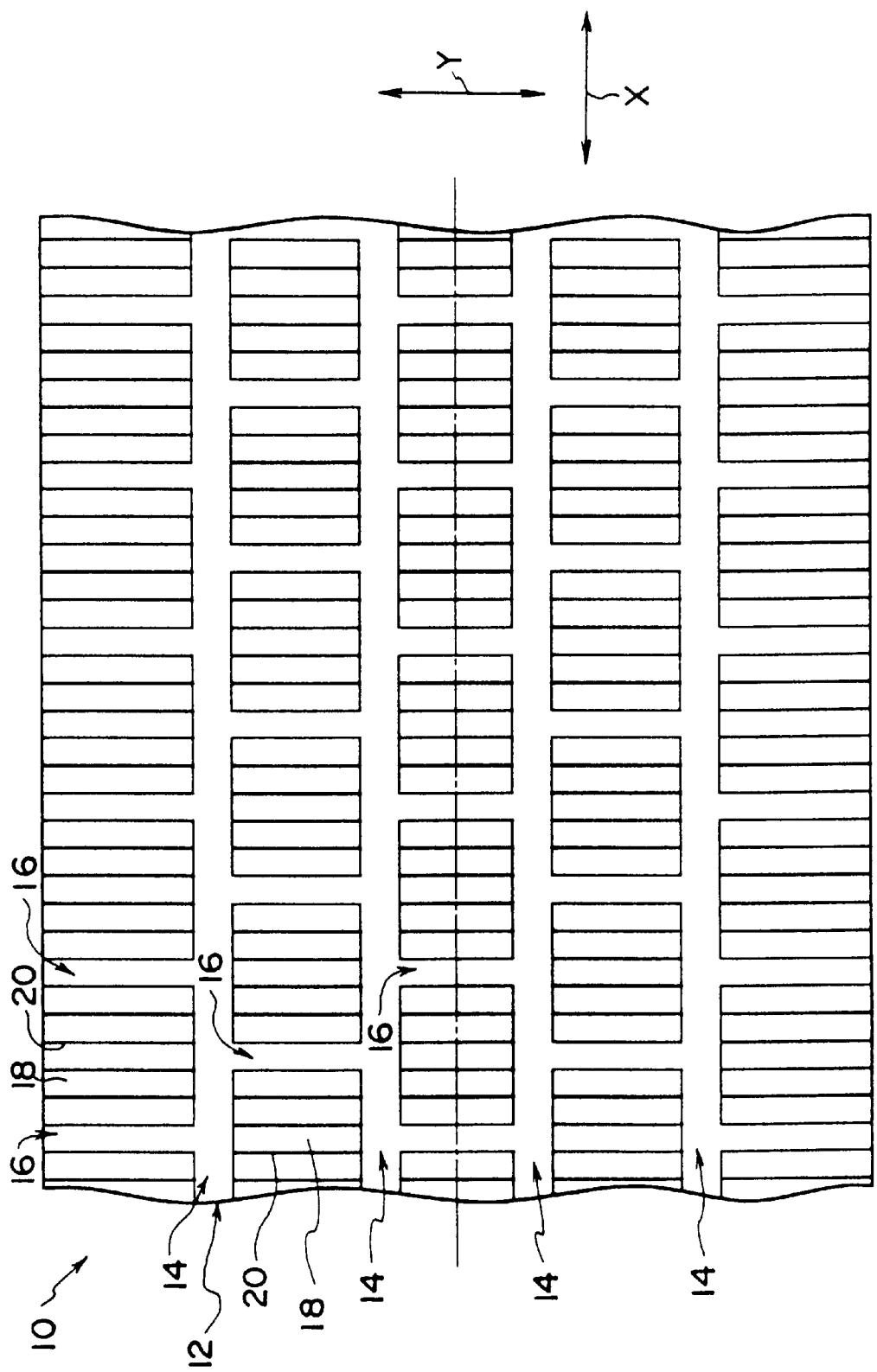
FIG. 1 is a plan view which shows a tread of a pneumatic tire in accordance with a first embodiment of the present invention.
Figure 2:
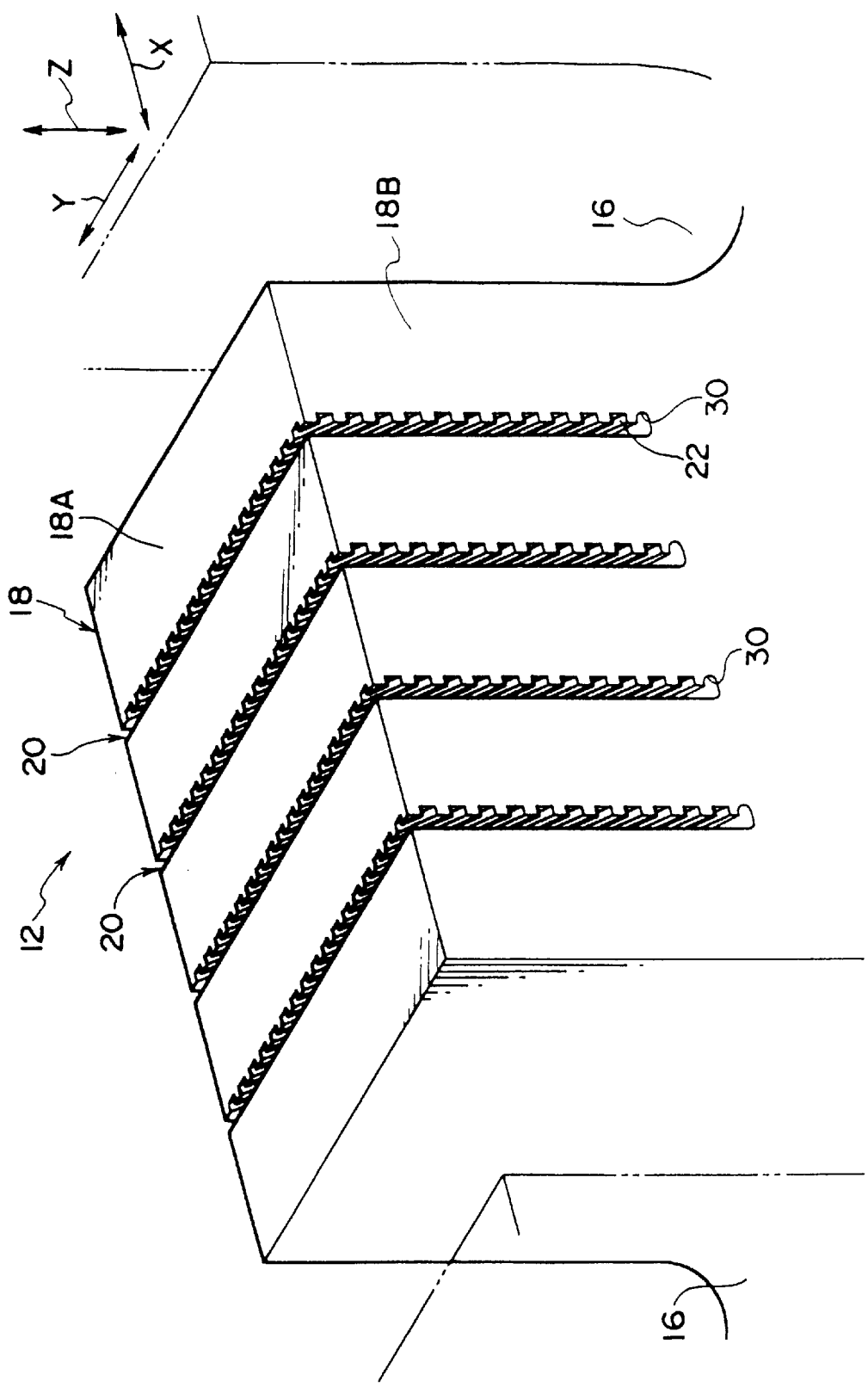
FIG. 2 is an enlarged perspective view of a block shown in FIG. 1.
Figure 3:
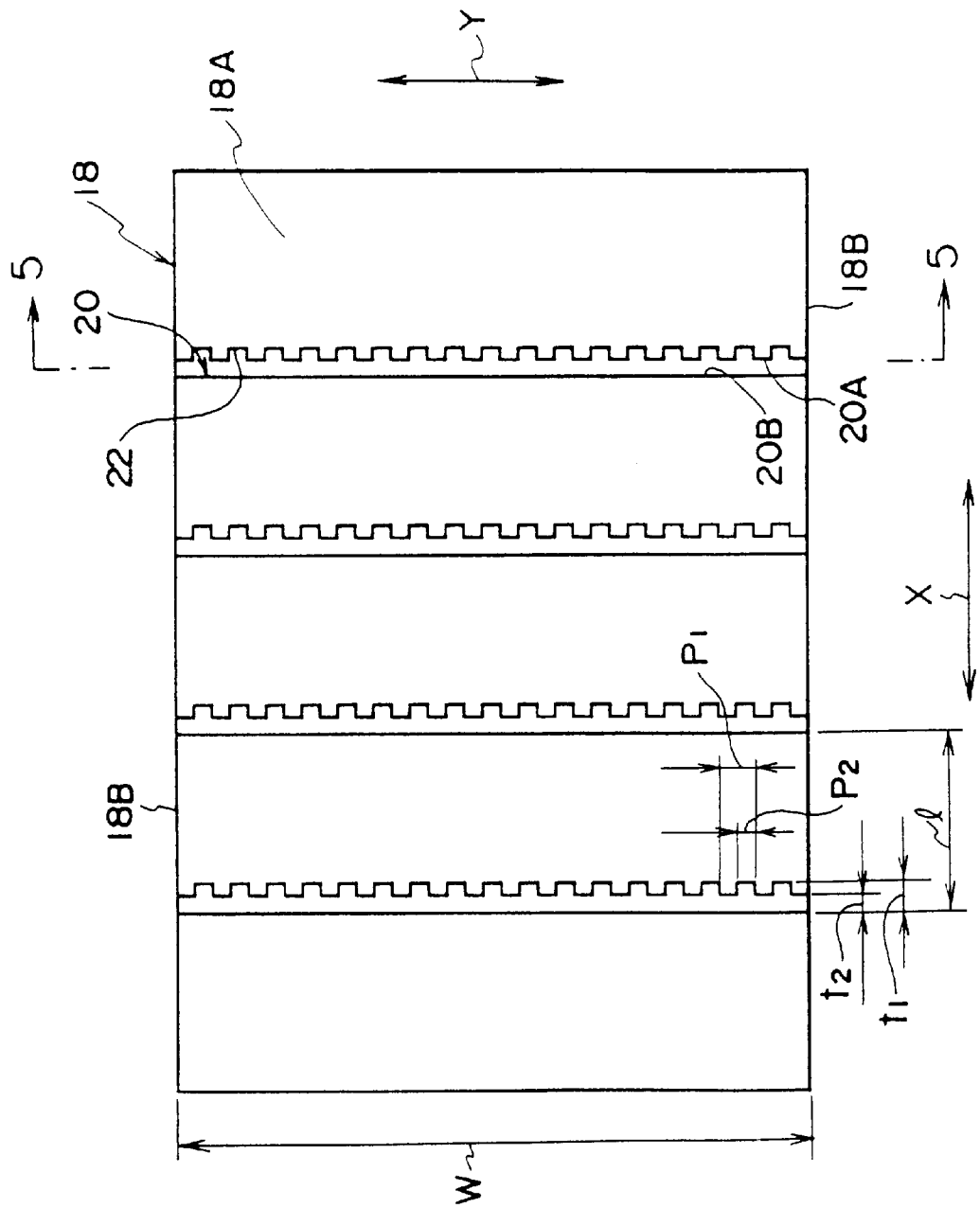
FIG. 3 is an enlarged plan view of the block shown in FIG. 1.

As shown in FIG. 1, a tread 12 of a tire 10 containing air (a size of the tire: 185/70R14) in accordance with the present embodiment is provided with a plurality of rectangular blocks 18 defined by a plurality of main peripheral grooves 14 extending along a peripheral direction (the direction indicated by arrow X) of the tire and a plurality of transverse grooves 16 extending along an axial direction (the direction indicated by arrow Y) of the tire, thereby forming a so-called block pattern.

In each of the blocks 18, four sipes 20 linearly crossing the block 18 along the axial direction of the tire are formed in a parallel manner.

Figure 4:
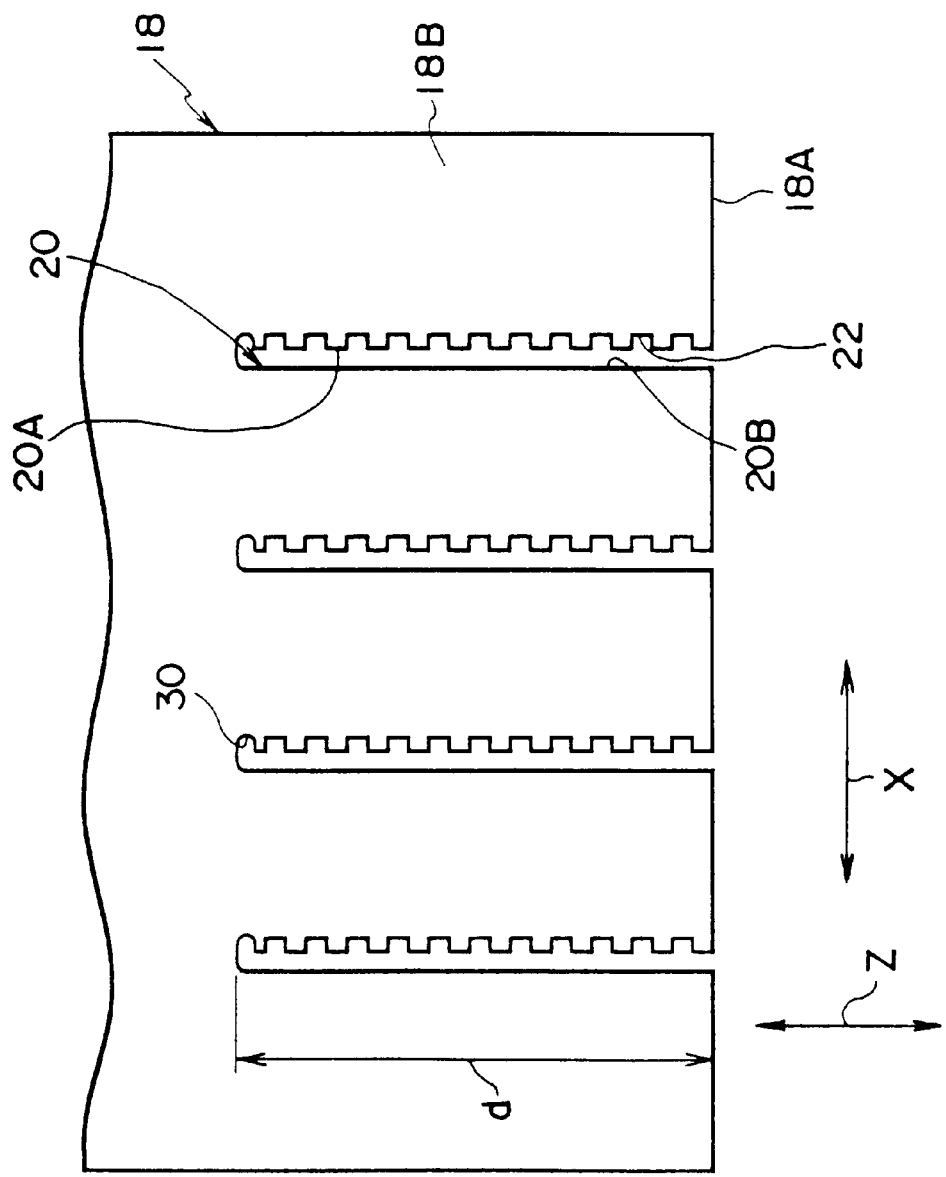
FIG. 4 is a side elevational view of the block shown in FIG. 1.
Figure 5:
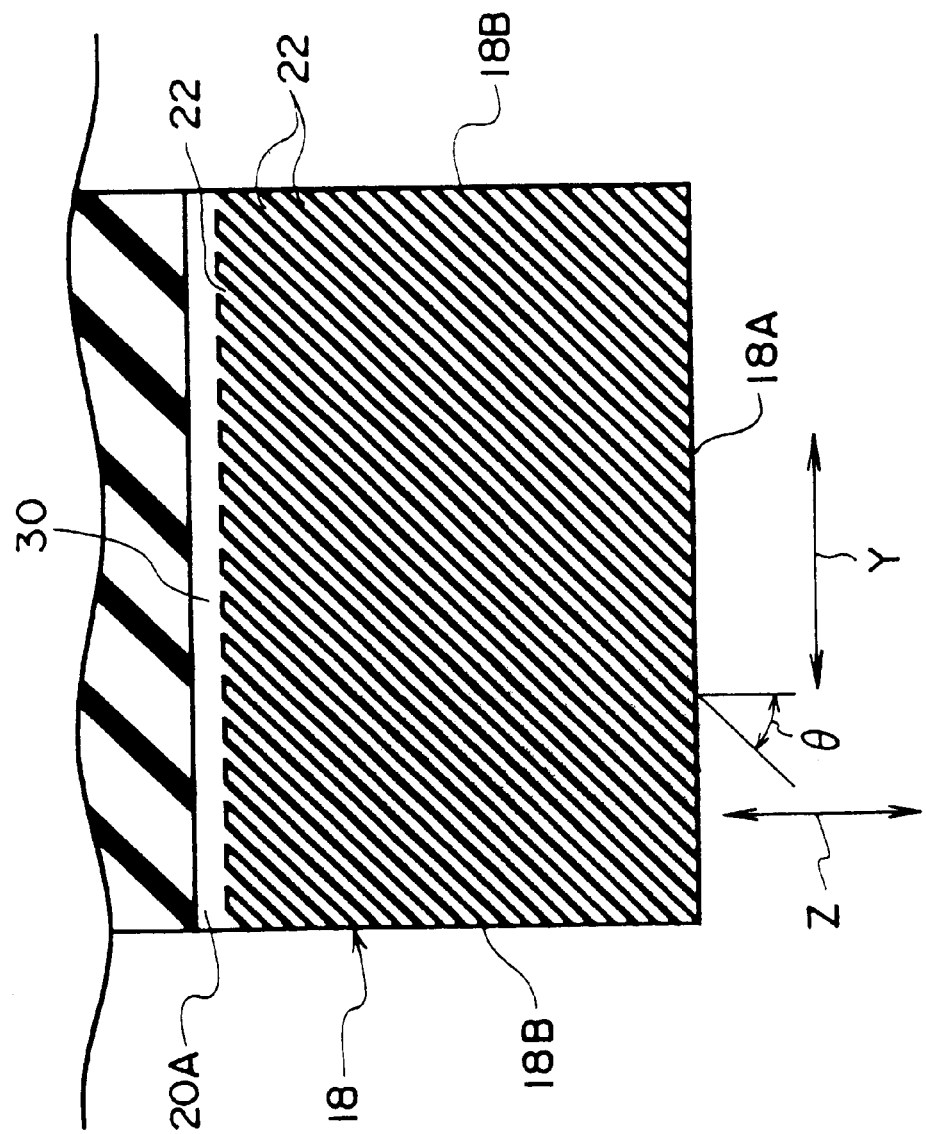
FIG. 5 is a cross sectional view taken along the line 5—5 of the block shown in FIG. 3.

As shown in FIGS. 4 and 5, an enlarged portion 30 is formed in a bottom portion of the sipe 20.

As shown in FIGS. 2 to 5, on one sipe side wall surface 20A of the sipe 20, a plurality of narrow grooves 22 having a rectangular cross section are formed.

As shown in FIG. 5, the narrow grooves 22 of the present embodiment are inclined to a certain direction with respect to a normal direction (the direction indicated by arrow Z) of the tire at a predetermined angle θ and are formed at a certain interval.

To a road contact surface portion 18A of the block 18 and a, side surface 18B of the block 18 in the main peripheral groove 14 side, end portions of the narrow grooves 22 are opened, and further some of the plurality of narrow grooves 22 are opened to the road contact surface portion 18A at one ends thereof and opened to the side surface 18B at the other ends thereof.

Figure 6:
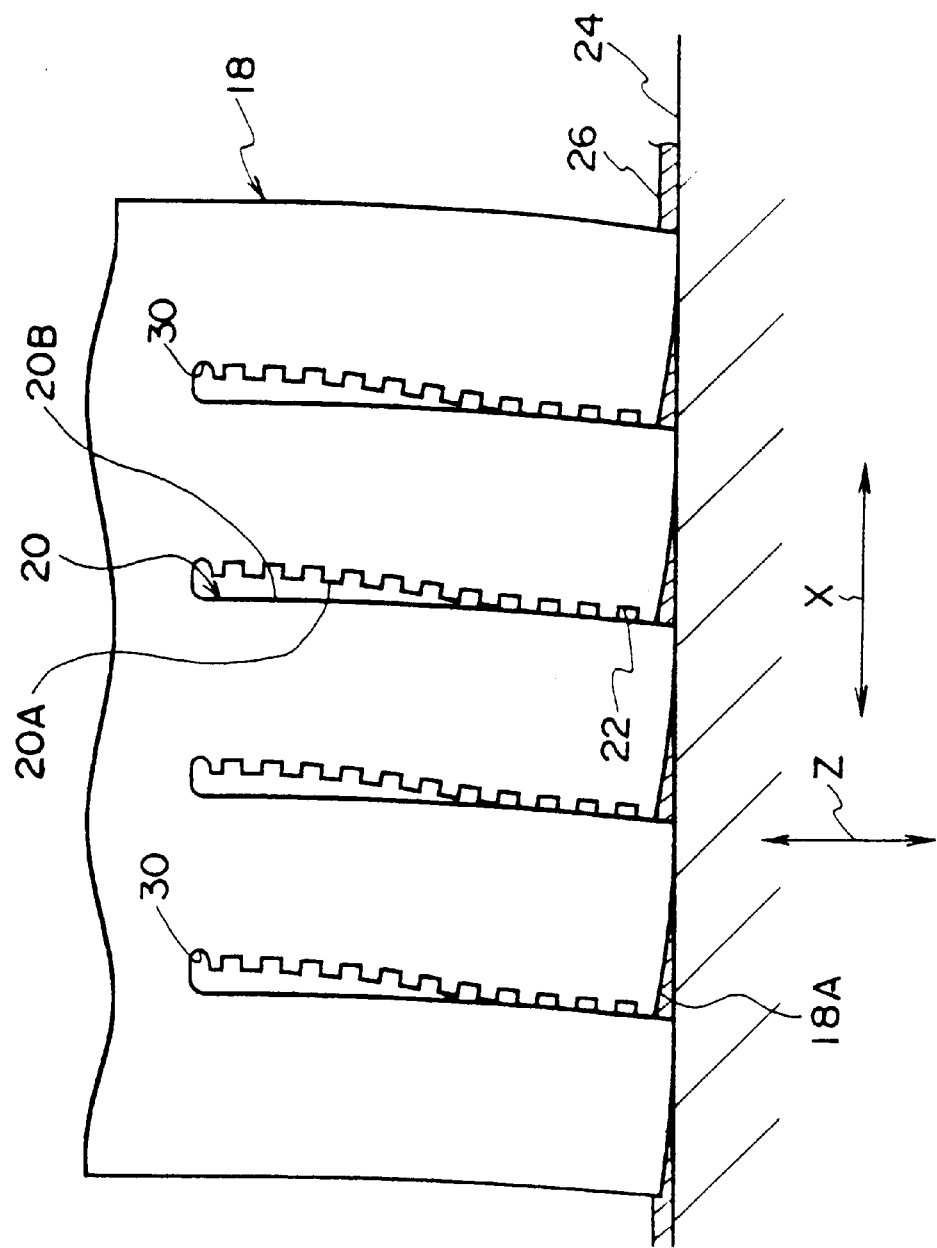
FIG. 6 is a side elevational view of the block which is in contact with an ice road surface.

The sipe 20 is structured such that in the case that the block 18 is not in contact with the road surface as shown in FIG. 4, the one sipe sidewall surface 20A and the other opposing sipe side wall surface 20B are apart from each other at a predetermined distance and in the case that the block 18 is brought into contact with the road surface by a load application as shown in FIG. 6, these sipe side wall surfaces 20A and 20B are brought into contact with each other. In this case, a bottom of the narrow groove 22 is formed such as not to be in contact with the other opposing sipe side wall surface 20B under the road contact condition, that is, the narrow groove 22 has a predetermined cross sectional area.

In this case, a thickness $t_1$ of the large thickness portion of the sipe 20 in the road contact surface portion 18A, a ratio $t_2/t_1$ between a thickness $t_2$ of the small thickness portion and the thickness $t_1$ of the large thickness portion, an interval $P_1$ of the large thickness portions, a ratio $P_2 P_1$ of the large thickness portion (a width $P_2$ of the large thickness portion in the road contact surface portion 18A with respect to $P_1$), an interval L of the sipes, a depth d of the sipe, a ratio between a total length of the large thickness portions ($\Sigma P_2$) and a length W of the sipe, and an angle θ of inclination of the large thickness portion with respect to a normal direction of the tire are shown in FIG. 9.

Next, the operation of the present embodiment will be explained below.

Figure 7:
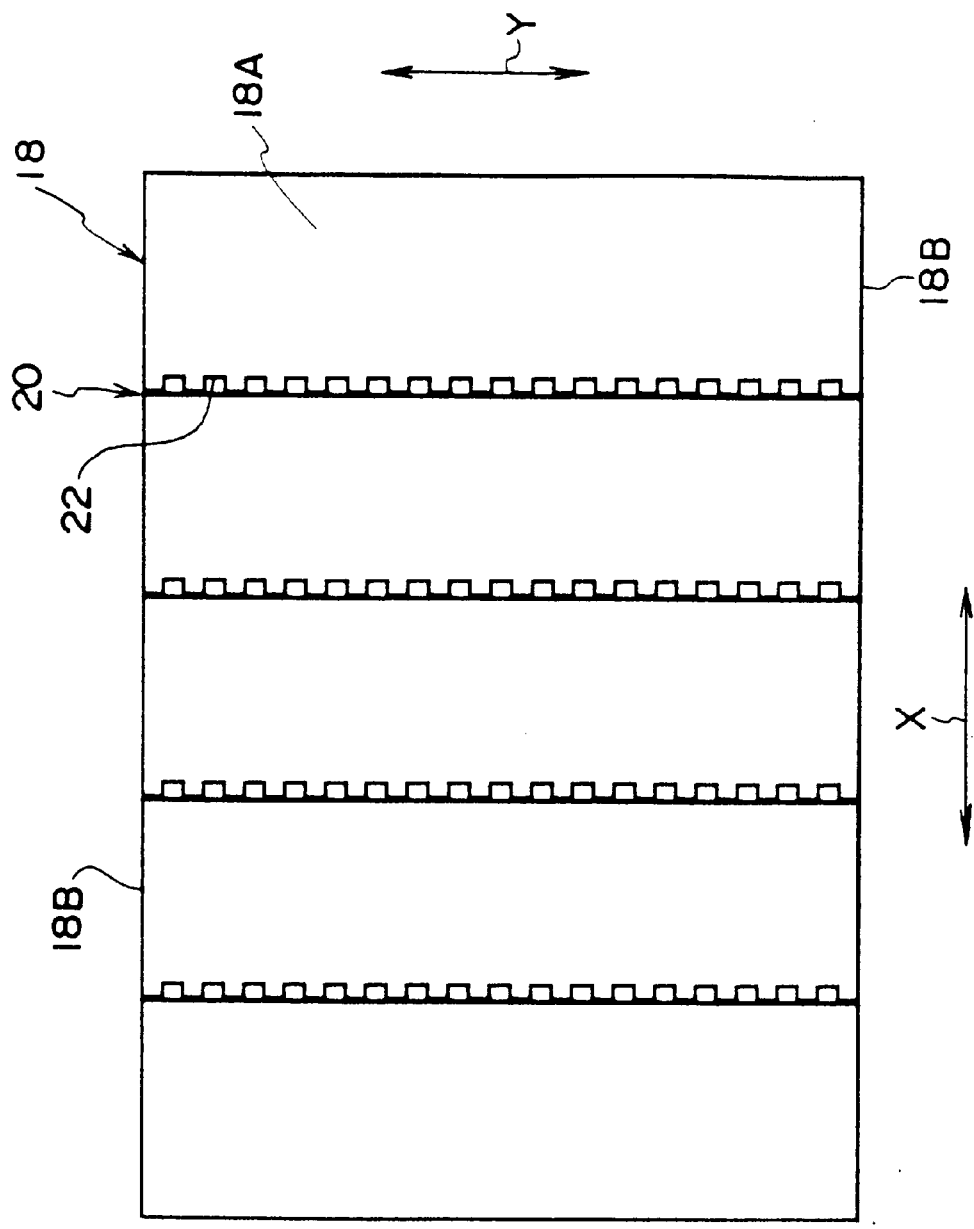
FIG. 7 is a plan view of the block which is in contact with an ice road surface.
Figure 8:
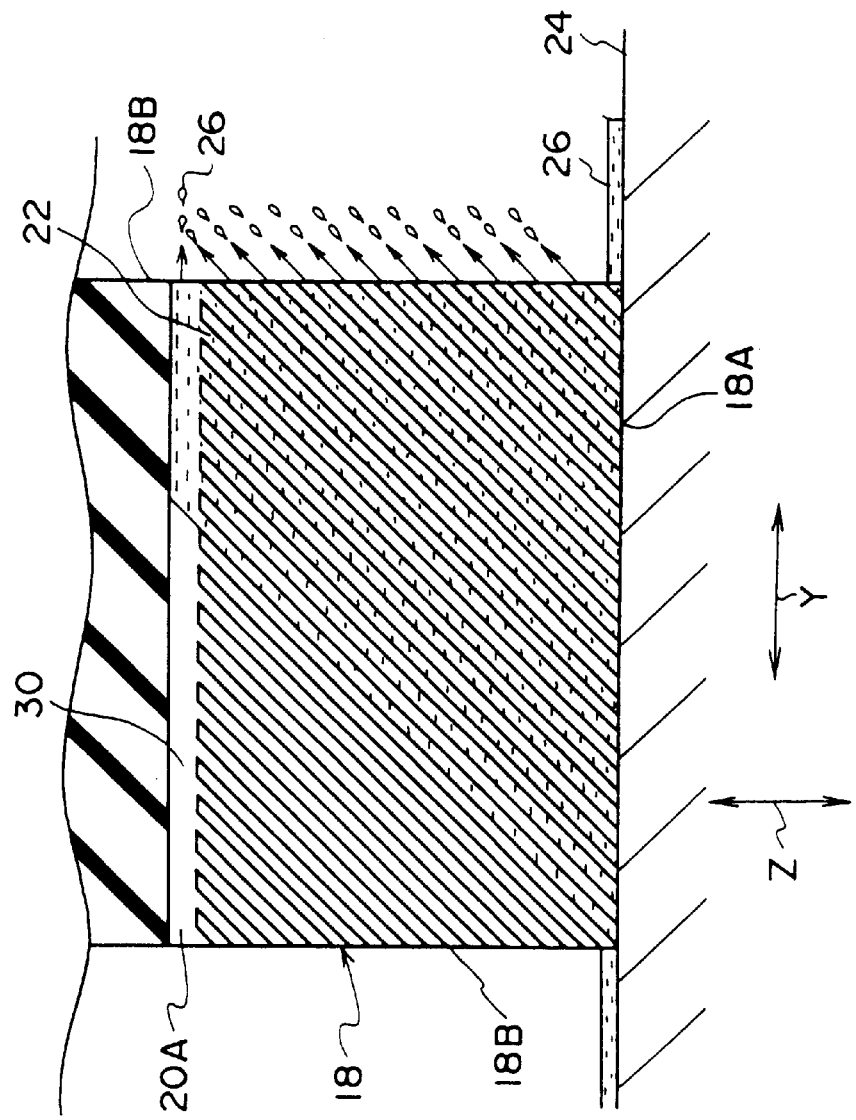
FIG. 8 is a cross sectional view along a sipe which shows the block being in contact with an ice road surface.

Since the tire 10 containing air in accordance with the present invention is provided with the plurality of narrow grooves 22 on the side surface 20A of the sipe 20, even when the small thickness portions (portions having no narrow groove 22) of the sipe 20 are brought into contact with the sipe side wall surface 20B to be closed under a load application to the tire as shown in FIGS. 6 and 7, the large thickness portions (portions having the narrow grooves 22) are not in contact with the sipe side surface 20B. Accordingly, water (water film) 26 on an ice road surface 24 can be absorbed and removed by the narrow grooves 22 as shown in FIG. 8.

Further, since the narrow grooves 22 having one end open to the road contact surface portion 18A and the other end open to the side surface 18B can continuously discharge the absorbed water to outside of the block 18, that is, to the peripheral main groove 14 in serial order, the water 26 on the ice road surface 24 can be removed further more.

In the tire 10 containing air in accordance with the present embodiment, the tire performance on ice due to the edge effect by the sipe 20 can be secured.

Further, in accordance with the above structure of the sipe, even if a number of the sipe is increased and the thickness of the sipe 20 is significantly narrow as a whole to secure the rigidity of the block, the interval for removing the water film can be always secured under the load application because the thickness of the sipe 20 is alternately changed between the large thickness and the small thickness.

Second Embodiment

Figure 10:
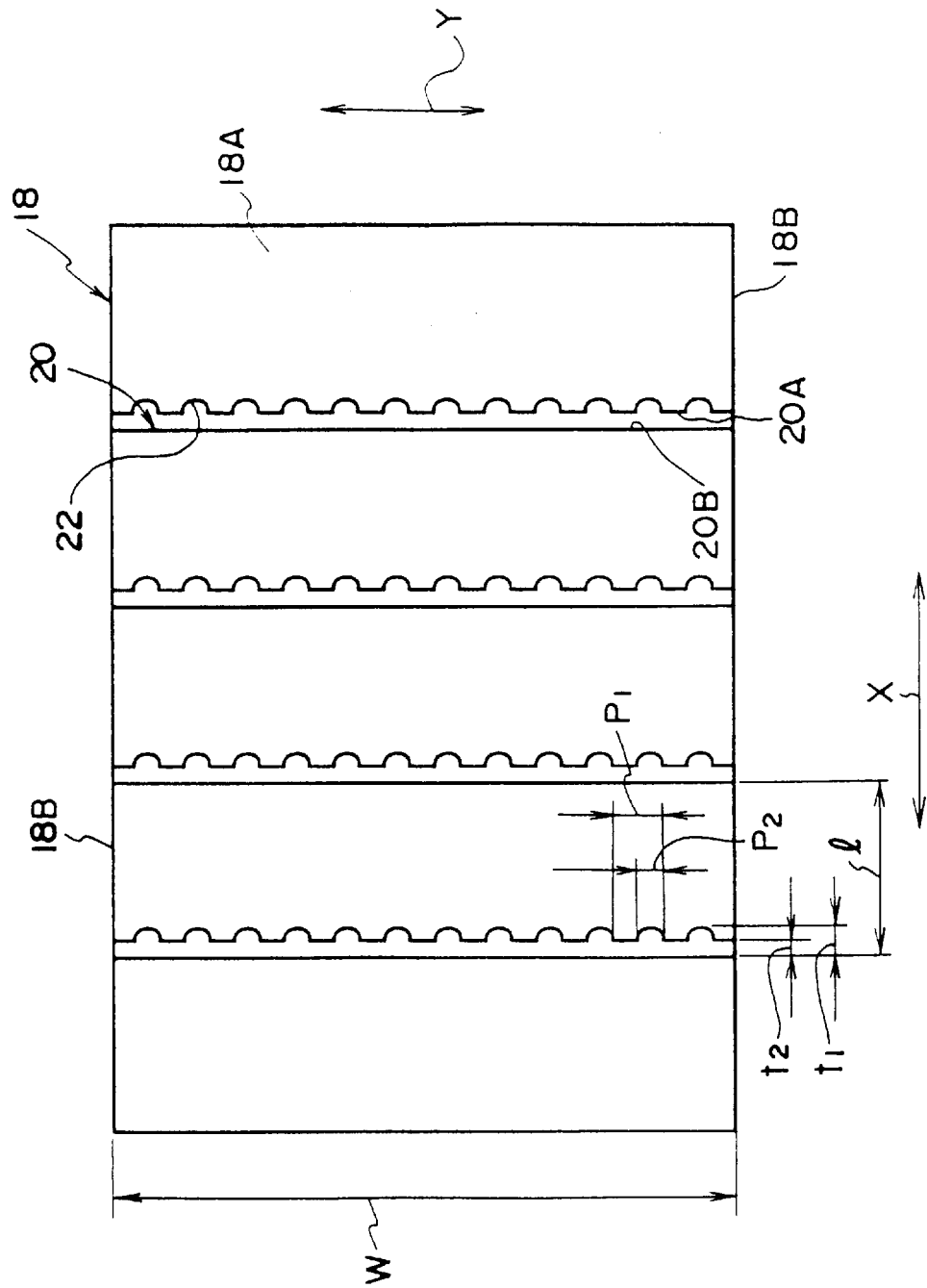
FIG. 10 is a plan view which shows a block of a pneumatic tire in accordance with a second embodiment of the present invention.
Figure 11:
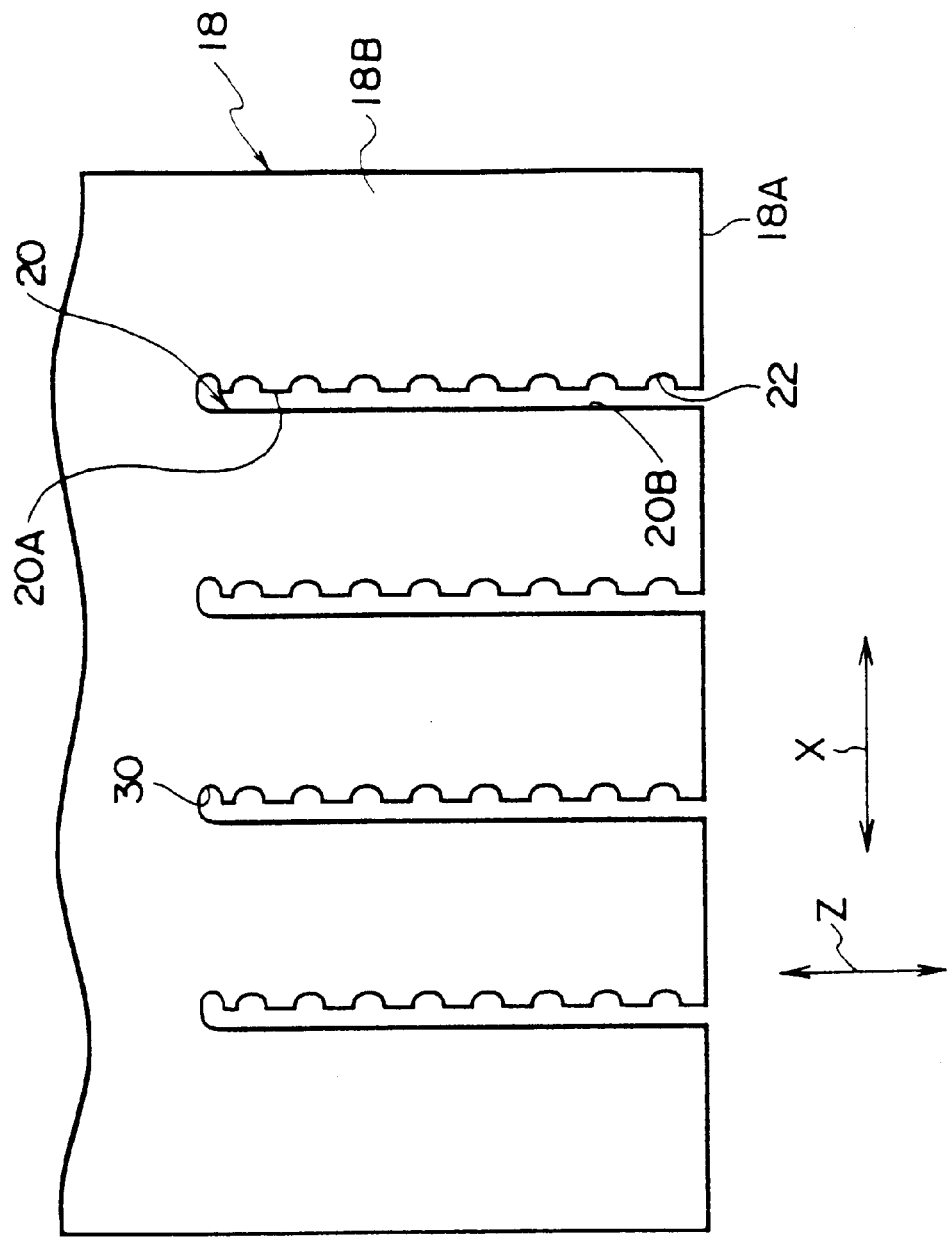
FIG. 11 is a side elevational view which shows the block of the pneumatic tire in accordance with the second embodiment.

A second embodiment in accordance with the present invention will be explained below with reference to FIGS. 10 to 11. In the below explanation, the same reference numerals are attached to the same elements in the embodiment mentioned above and the explanation thereof is omitted.

In the above-mentioned first embodiment, the first cross sectional shape of the narrow groove 22 is set to a rectangular shape. In contrast of this, in the present embodiment, the narrow groove 22 has a substantially half circle shape Accordingly, as shown in FIGS. 10 and 11, a shape of an opening portion of the narrow groove 22 which appears in the road contact surface portion 18A and the side surface 18B of the block 18 is a substantially half oval shape.

In this case, a thickness $t_1$ of the large thickness portion of the sipe 20 in the road contact surface portion 18A, a ratio $t_2/t_1$ between a thickness $t_2$ of the small thickness portion and the thickness $t_1$ of the large thickness portion, an interval $P_1$ of the large thickness portions, a ratio $P_2/P_1$ of the large thickness portion (a width $P_2$ of the large thickness portion in the road contact surface portion 18A with respect to $P_1$), an interval L of the sipes, a depth d of the sipe, a ratio between a total length of the large thickness portions ($\Sigma P_2$) and a length W of the sipe, and an angle θ of inclination of the large thickness portion with respect to a normal direction of the tire are shown in FIG. 9.

Third Embodiment

Figure 12:
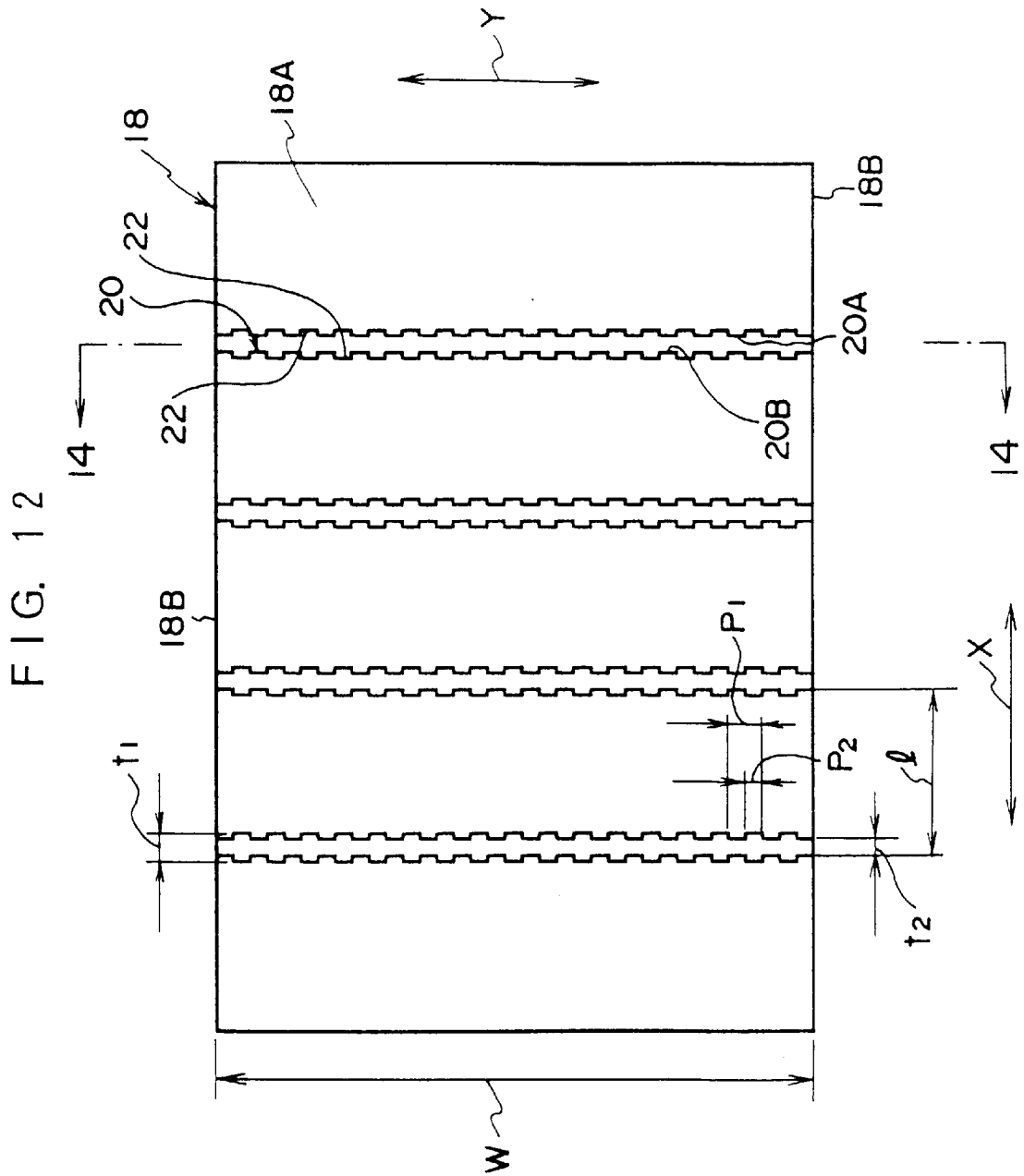
FIG. 12 is a plan view which shows a block of a pneumatic tire in accordance with a third embodiment of the present invention.
Figure 13:
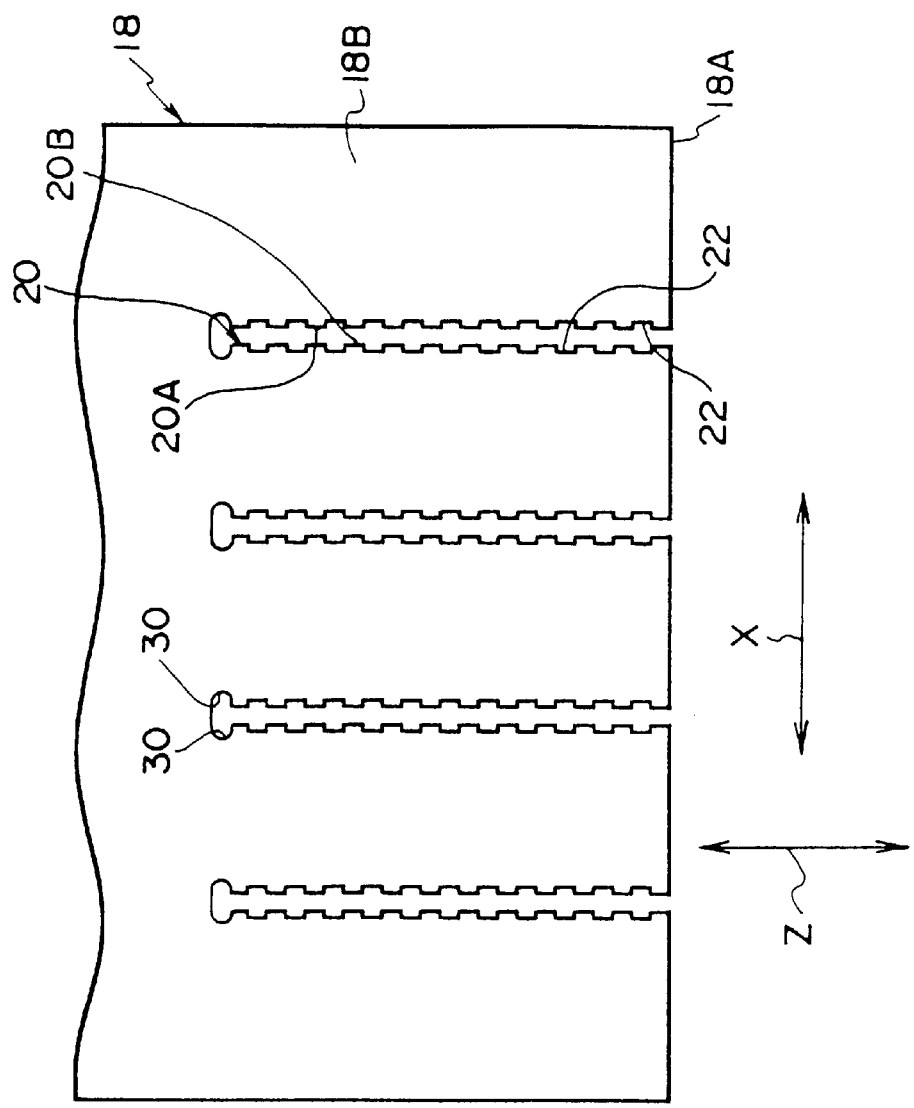
FIG. 13 is a side elevational view which shows the block of the pneumatic tire in accordance with the third embodiment.
Figure 14:
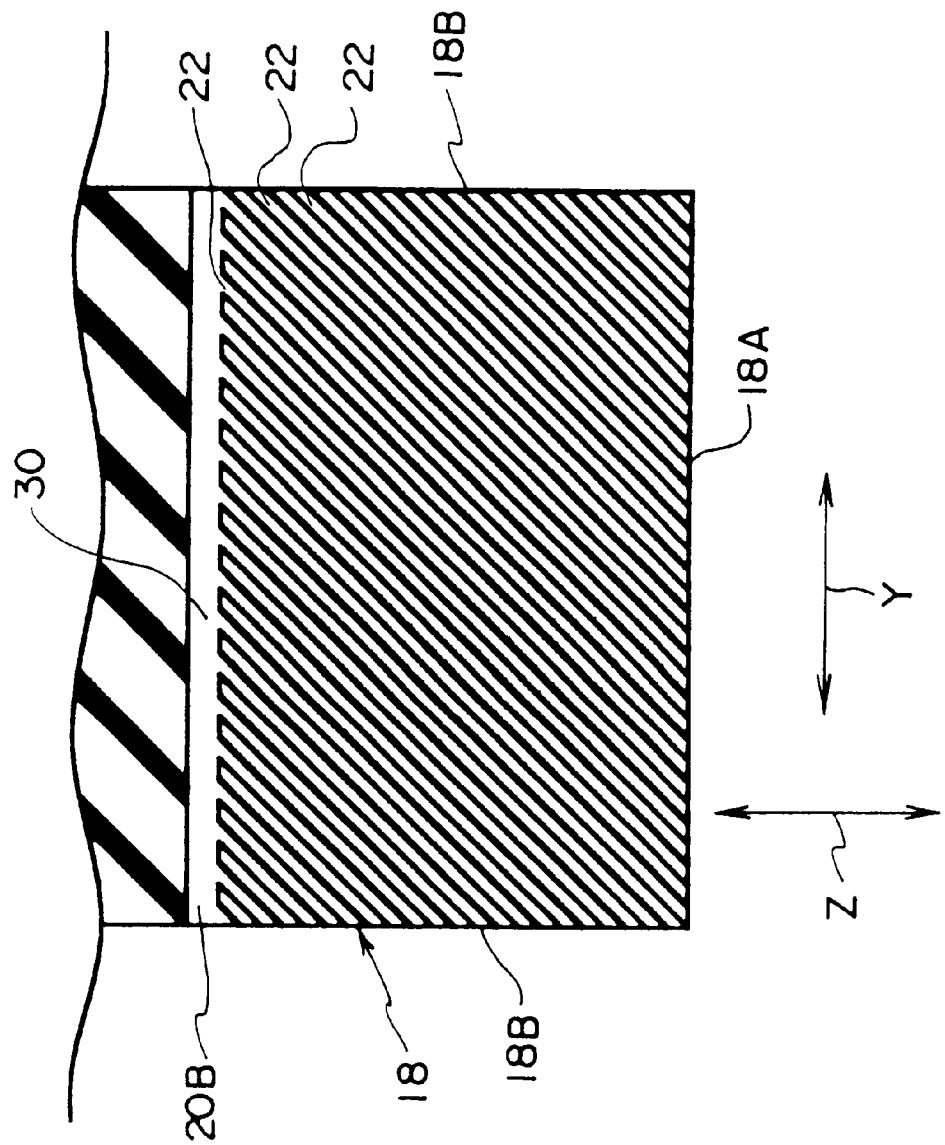
FIG. 14 is a cross sectional view taken along the line 14—14 of the block shown in FIG. 12.

A third embodiment in accordance with the present invention will be explained below with reference to FIGS. 12 to 14. In the below explanation, the same reference numerals are attached to the same elements in the embodiment mentioned above and the explanation thereof is omitted.

In the above-mentioned first embodiment, the narrow grooves 22 are formed only on the sipe side surface 20A. In contrast of this, in the present embodiment, the narrow grooves 22 are also formed on the sipe side surface 20B as shown in FIG. 14.

In this case, the narrow grooves 22 on the sipe side surface 20A and the narrow grooves 22 on the sipe side surface 20B are inclined to an opposite direction to each other with respect to the normal direction. Further, as shown in FIGS. 12 and 13, in the road contact surface portion 18A and the side surface 18B of the block 18, the end portions of the narrow grooves 22 on the sipe side surface 20A and the end portions of the narrow grooves 22 on the sipe side surface 20B are opposed to each other.

In this case, a thickness $t_1$ of the large thickness portion of the sipe 20 in the road contact surface portion 18A, a ratio $t_2/t_1$ between a thickness $t_2$ of the small thickness portion and the thickness $t_1$ of the large thickness portion, an interval $P_1$ of the large thickness portions, a ratio $P_2/P_1$ of the large thickness portion (a width $P_2$ of the large thickness portion in the road contact surface portion 18A with respect to $P_1$), an interval L of the sipes, a depth d of the sipe, a ratio between a total length of the large thickness portions ($\Sigma P_2$) and a length W of the sipe, and an angle θ of inclination of the large thickness portion with respect to a normal direction of the tire are shown in FIG. 9.

Fourth Embodiment

Figure 15:
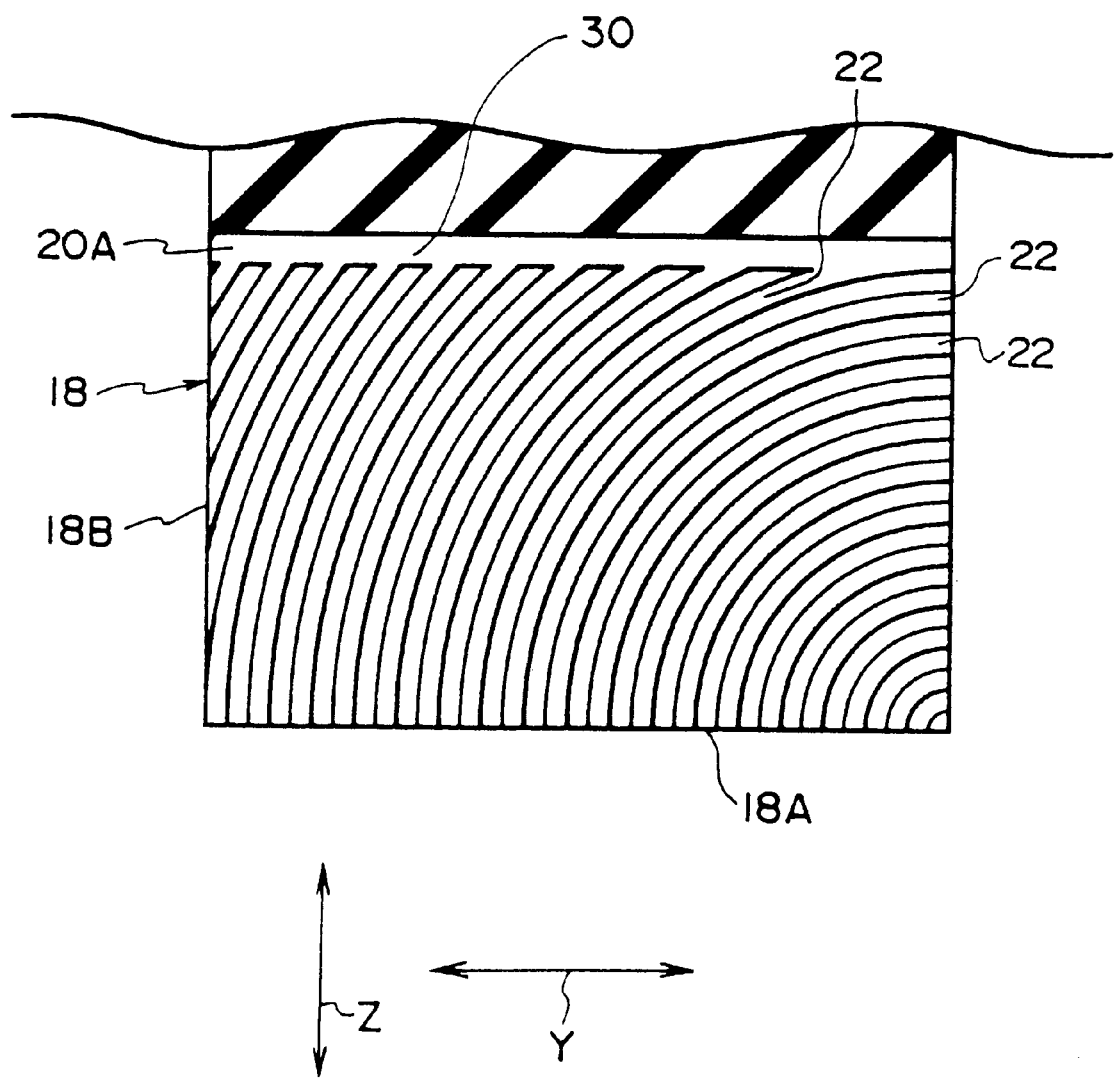
FIG. 15 is a cross sectional view along a sipe which shows a block of a pneumatic tire in accordance with a fourth embodiment of the present invention.
Figure 16:
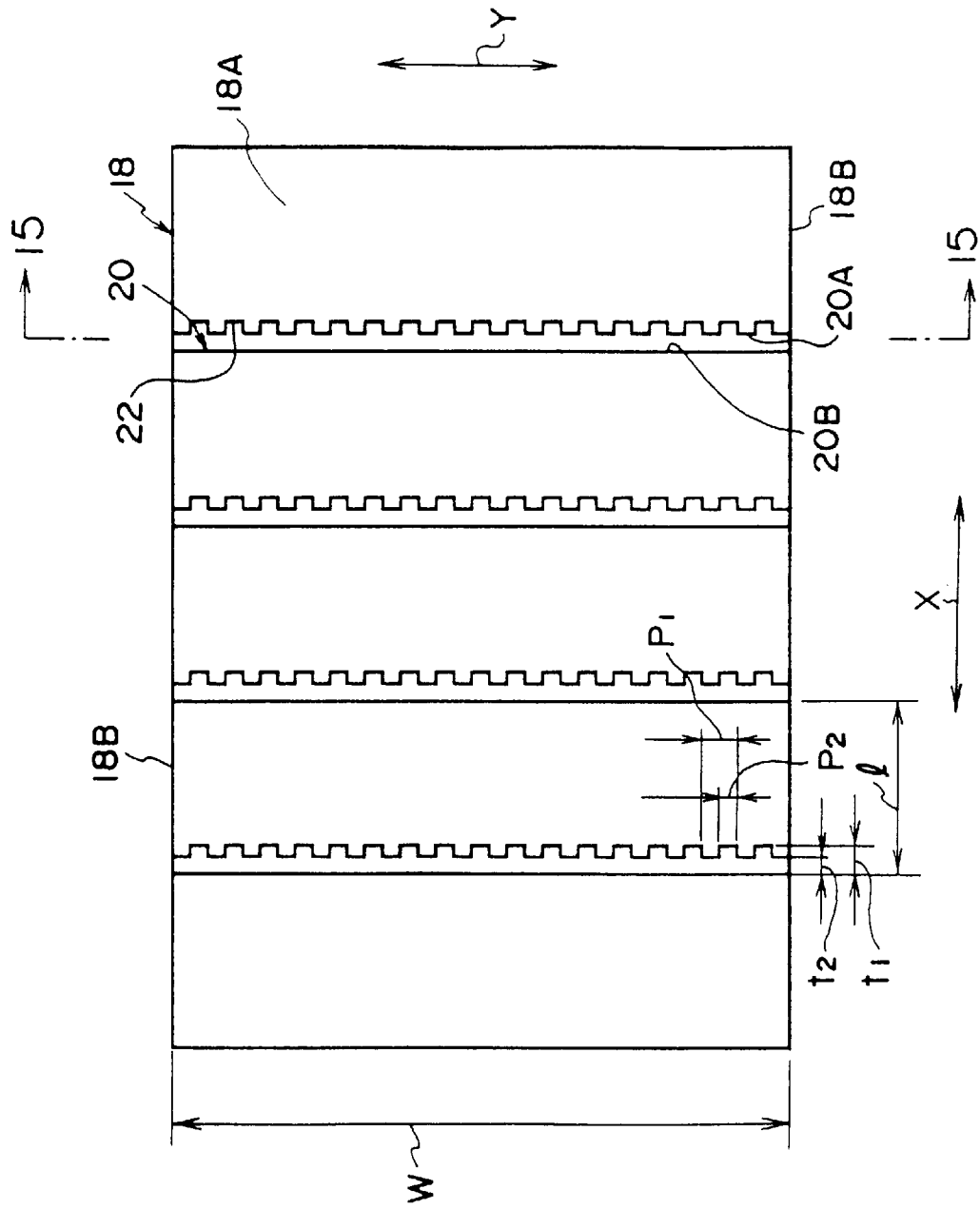
FIG. 16 is a plan view which shows the block of the pneumatic tire in accordance with the fourth embodiment.
Figure 17:
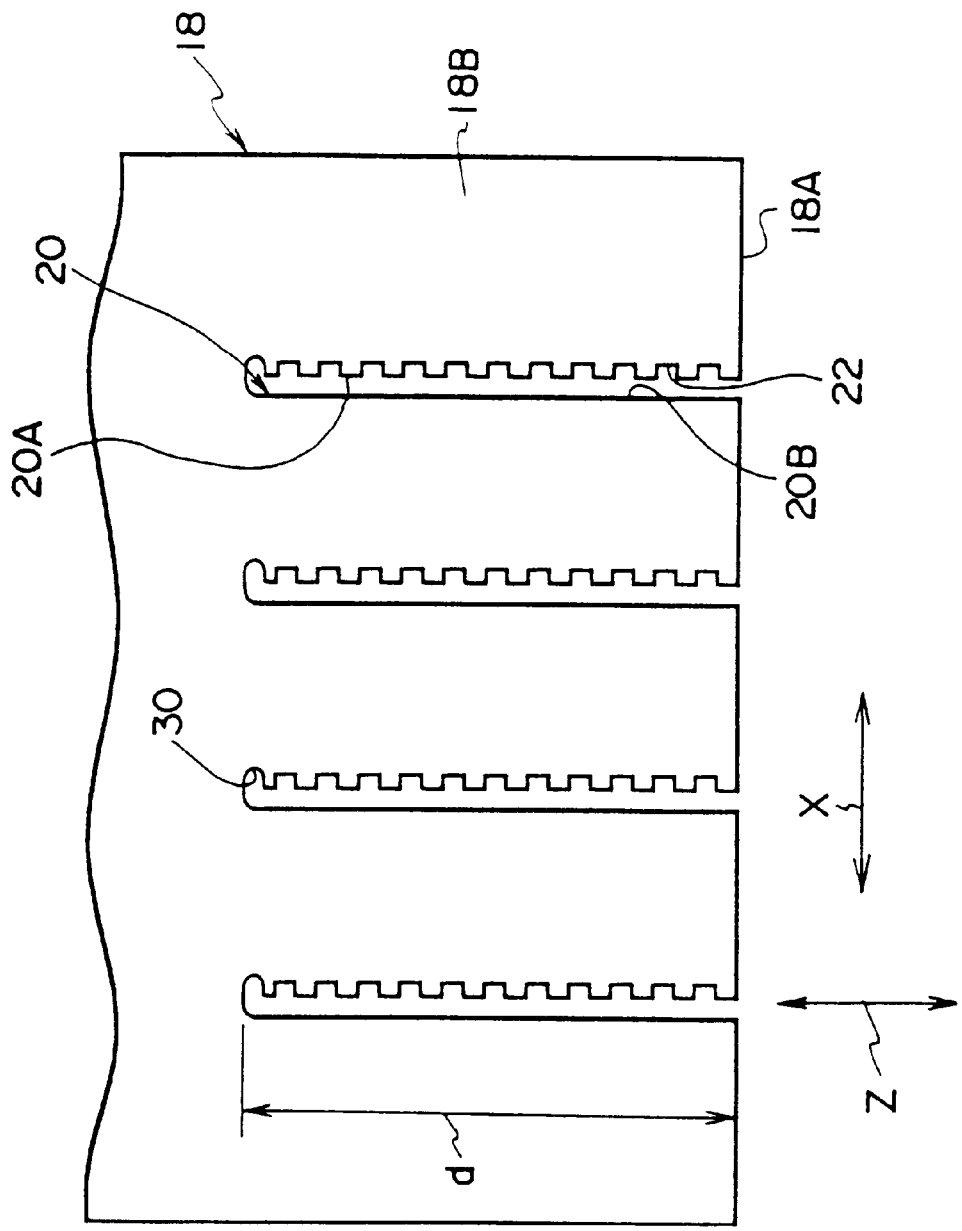
FIG. 17 is a side elevational view which shows the block of the pneumatic tire in accordance with the fourth embodiment.

A fourth embodiment in accordance with the present invention will be explained below with reference to FIGS. 15 to 17. In the below explanation, the same reference numerals are attached to the same elements in the embodiment mentioned above and the explanation thereof is omitted.

In the above-mentioned embodiments, the narrow groove 22 has a linear shape. In contrast, in the fourth embodiment, the narrow groove 22 has a circular arc shape having a center of curvature in a portion close to the end of the one block as shown in FIGS. 15 to 17 and each of some of the plurality of narrow grooves 22 has one end open to the road contact surface portion 18A and the other end open to the side surface 18B.

In this case, a thickness $t_1$ of the large thickness portion of the sipe 20 in the road contact surface portion 18A, a ratio $t_2/t_1$ between a thickness $t_2$ of the small thickness portion and the thickness $t_1$ of the large thickness portion, an interval $P_1$ of the large thickness portions, a ratio $P_2/P_1$ of the large thickness portion (a width $P_2$ of the large thickness portion in the road contact surface portion 18A with respect to $P_1$), an interval L of the sipes, a depth d of the sipe, a ratio between a total length of the large thickness portions ($\Sigma P_2$) and a length W of the sipe, and an angle $\theta$ of inclination of the large thickness portion with respect to a normal direction of the tire are shown in FIG. 9.

Figure 18:
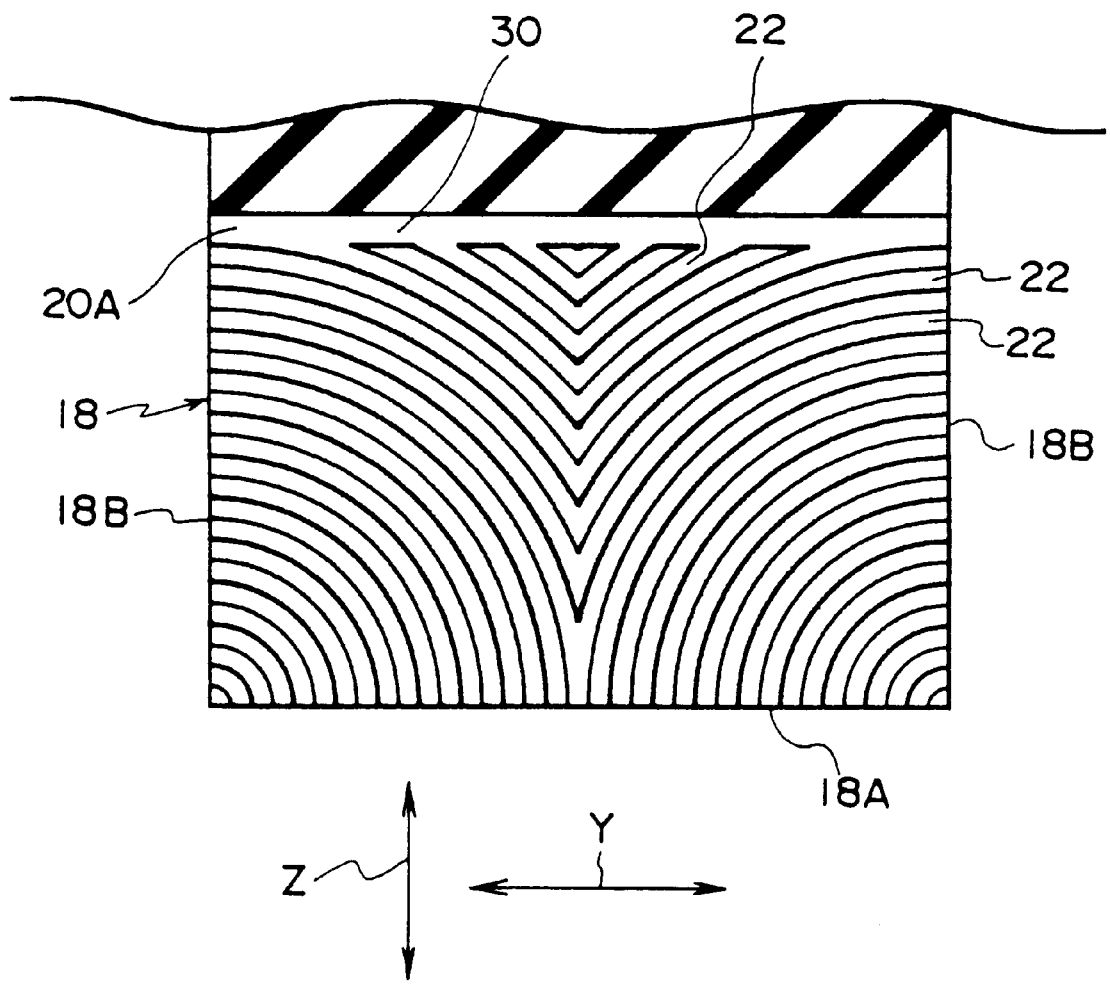
FIG. 18 is a cross sectional view along a sipe which shows a block of a pneumatic tire in accordance with the other embodiment of the present invention.

Further, as an alternative embodiment of this embodiment, centers of curvature of the narrow grooves 22 is disposed at both block ends as shown in FIG. 18.

Fifth Embodiment

A fifth embodiment in accordance with the present invention will be explained below with reference to FIGS. 22, 23A and 23B. In the below explanation, the same reference numerals are attached to the same elements in the embodiment mentioned above and the explanation thereof is omitted.

Figure 22:
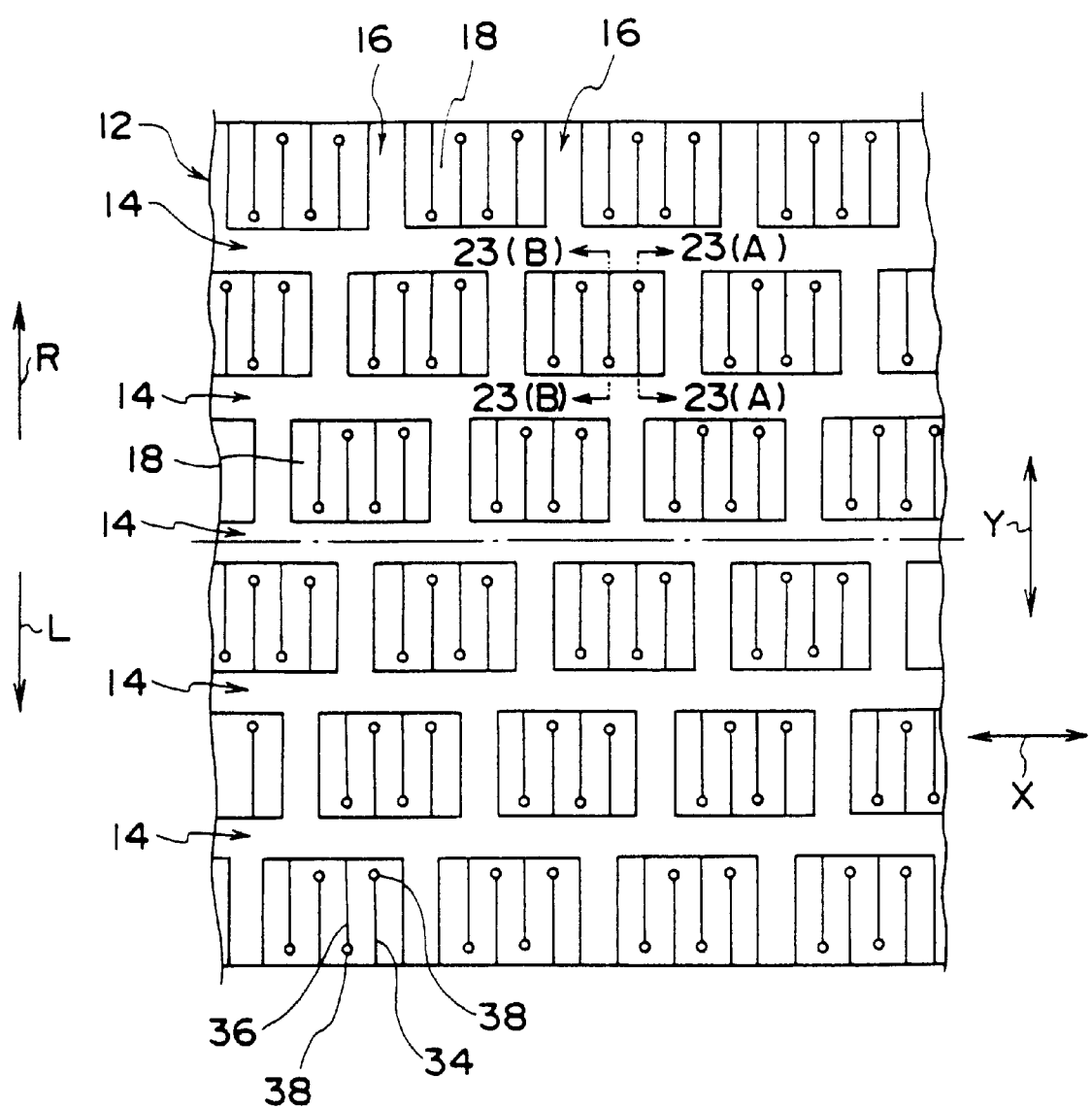
FIG. 22 is a plan view which shows a tread of a pneumatic tire in accordance with fifth embodiment of the present invention.

As shown in FIG. 22, each of the blocks 18 is provided with sipes 34 extending from a direction shown as an arrow L toward a direction shown as an arrow R and sipes 36 extending from the direction shown as the arrow R to the direction shown as the arrow L alternately. Each of the sipes 34 and 36 is structured such that an end in the longitudinal direction opens to the peripheral main groove 14 and the other end in the longitudinal direction terminates within the block 18.

The other end in the longitudinal direction of each of these sipes 34 and 36 is provided with an enlarged portion 38. In the present embodiment, the enlarged portion 38 is formed as a circular hole.

Figure 23A:
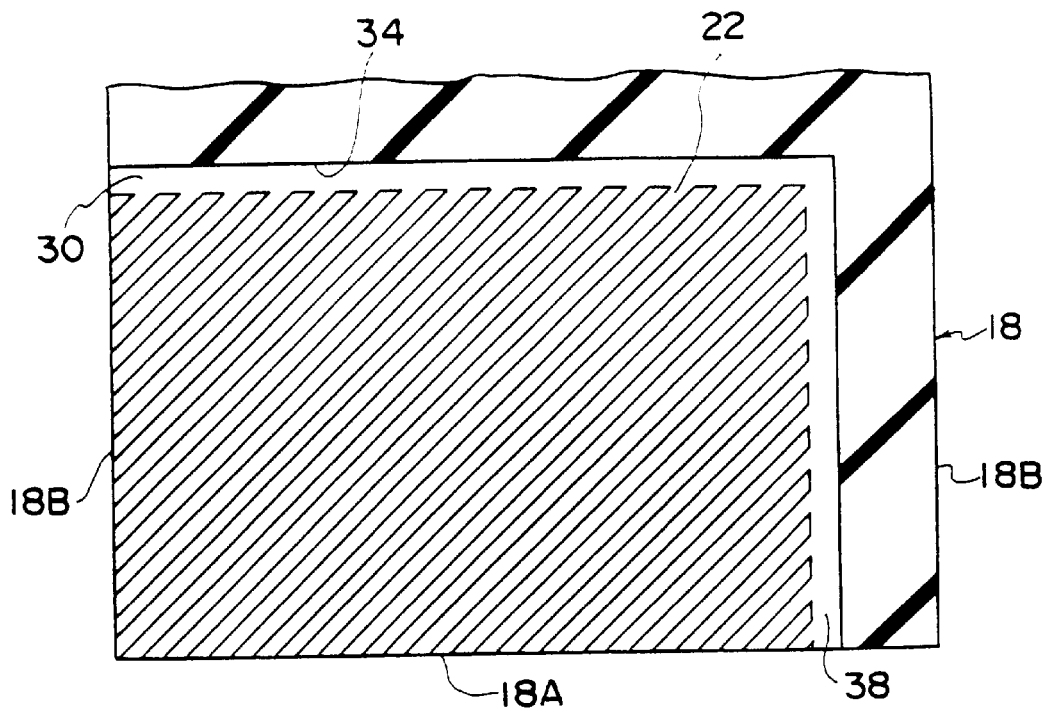
FIG. 23A is a cross sectional view taken along the line 23A—23A of the block shown in FIG. 22.

As shown in FIG. 23A, the enlarged portion 38 of the sipe 34 is connected to the enlarged portion 30 of the bottom portion of the sipe.

Figure 23B:
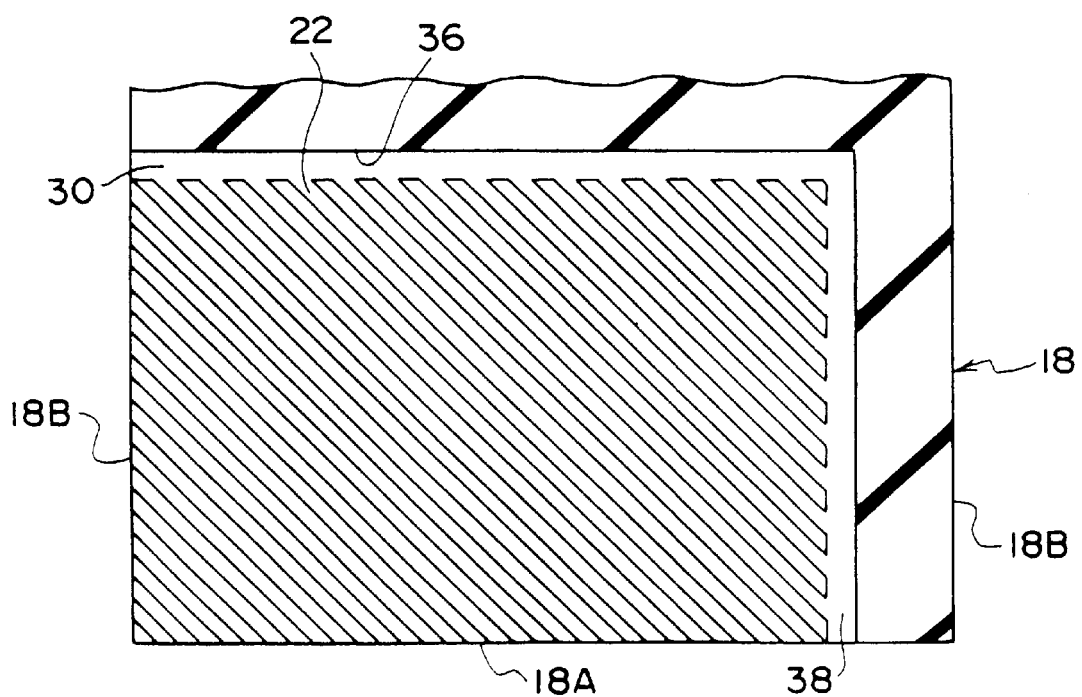
FIG. 23B is a cross sectional view c 23B—23B of the block shown in FIG. 22.

Further, as shown in FIG. 23B, the enlarged portion 38 of the sipe 36 is connected to the enlarged portion 30 of the bottom portion of the sipe.

In the present embodiments, water (water film) in the ice road surface 24 is absorbed by the narrow groove 22 and the enlarged portion 38. Further, the water absorbed by the enlarged portion 38 can be discharged out of the block 18 through the enlarged portion 30 provided in the bottom portion of the sipe.

Since the block 18 in accordance with the present embodiment is structured such that the sipe 34 and the sipe 36 do not completely cross the block 18, with respect to the block 18 which is, for example, provided with the sipe 20 completely crossing the block 18 as shown in FIG. 1, deterioration of the rigidity of the block can be prevented so that generation of the unbalanced abrasion can be prevented.

Further, since the enlarged portion 38 is provided in the other end of the sipe 34 and the sipe 36, the stress given to the other end can be dispersed so that generation of the crack in the other end can be prevented.

Test Example

Four types of tires in accordance with the above embodiments and one type of conventional tire were prepared (Examples 1, 2, 3, and 4 correspond to the first, second, third, and four the embodiments, respectively) and a braking performance on ice and a traction performance on ice are examined in accordance with the following methods.

Test Method:

Braking performance on ice: A tire to be tested is mounted to a vehicle. A stopping distance at a time when the vehicle running at a speed of 20 km/h on an ice surface is fully braked is measured.

Traction performance on ice: An acceleration time from a start at a distance of 20 m on an ice surface is measured.

Results of the test are shown in FIG. 9. The results all shown as an index number in which the result of the conventional tire is presumed to be 100 and the greater the number is, the better the performance.

Figure 19A:
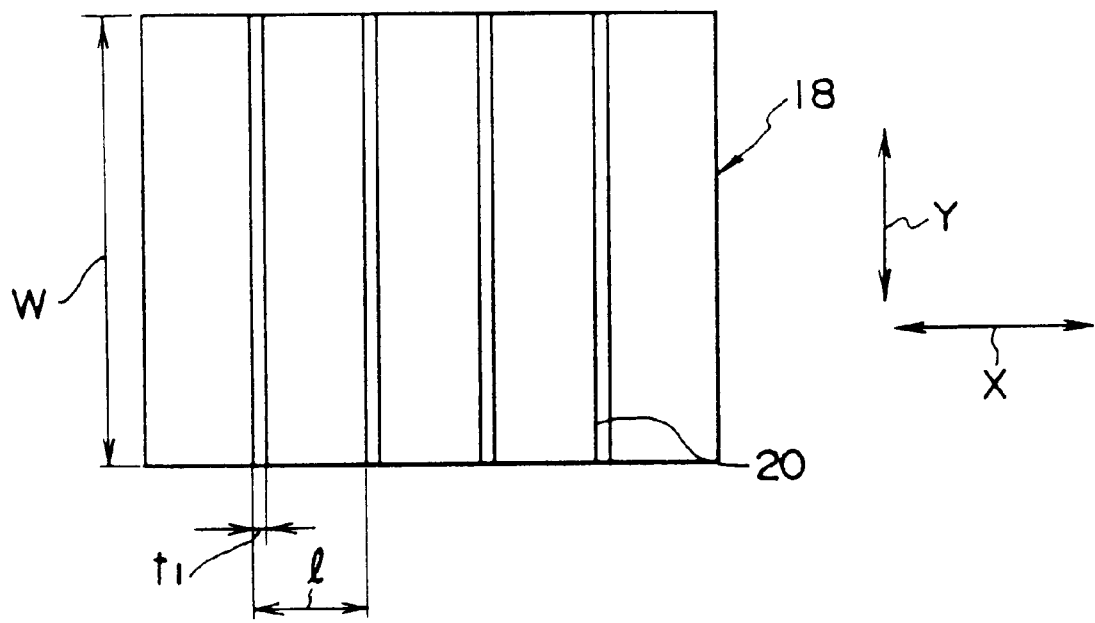
FIG. 19A is a plan view of a block in which a conventional sipe is formed.
Figure 19B:
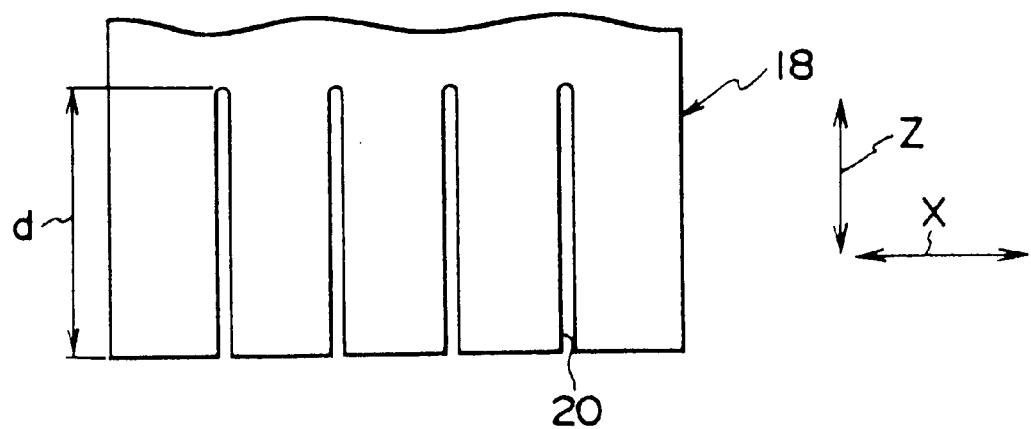
FIG. 19B is a side elevational view of the block shown in FIG. 19A.
Figure 20A:
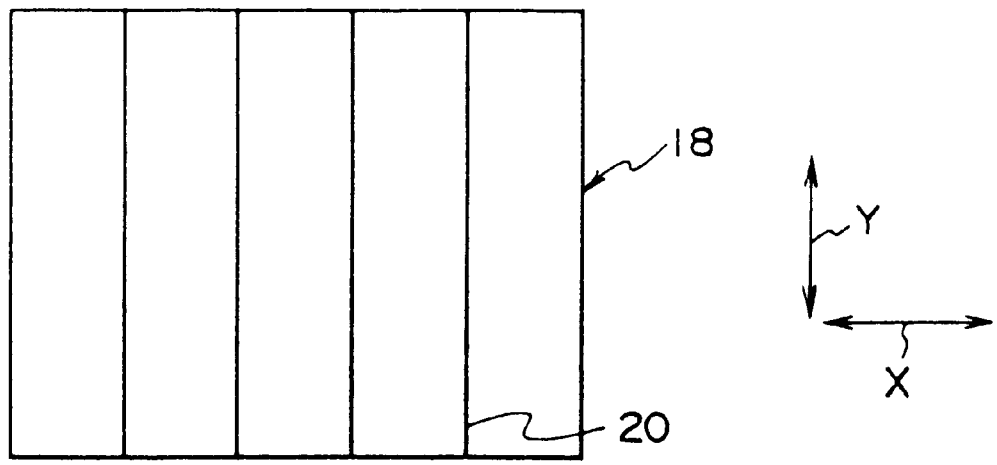
FIG. 20A is a plan view which shows a state in which a block having a conventional sipe is in contact with a road surface.
Figure 20B:
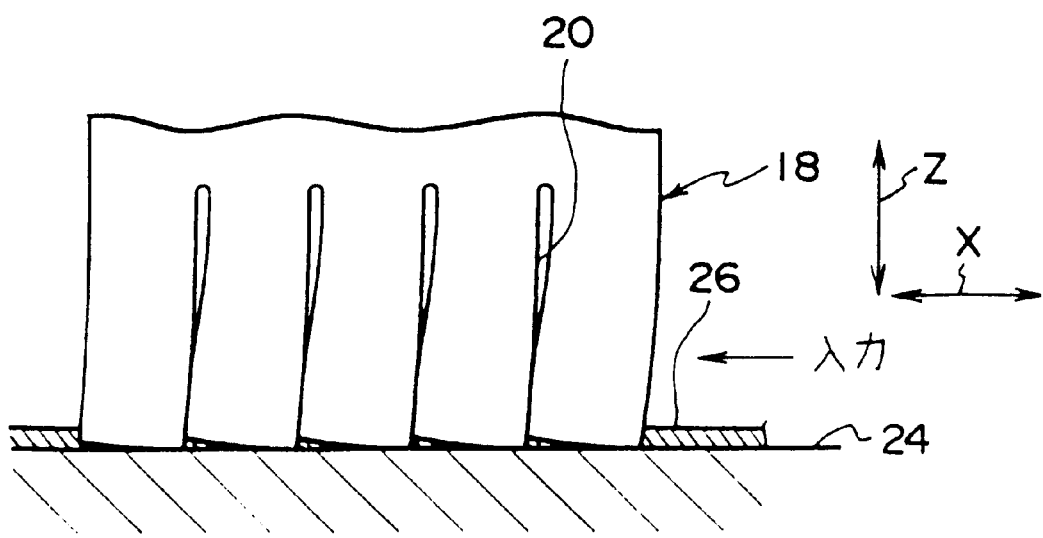
FIG. 20B is a side elevational view of the block shown in FIG. 20A.

In this case, the conventional tire is a pneumatic tire having the block 18 as shown in FIGS. 19A and 19B and the size of the block is the same as that of the embodiments. The size of the sipe is shown in FIG. 9.

From the test results shown in the table of FIG. 9, it is apparent that the tires in accordance with the first to fourth embodiments of the present invention are excellent in the braking performance on ice and the traction performance on ice compared to the conventional tire.

Further, since the tire in accordance with the third embodiment has the narrow grooves on the both wall surface of the sipe so as to cross to each other, the braking performance on ice and the traction performance on ice therein are more improved than those in the tire having the narrow grooves on one surface.

Still further, in the tire in accordance with the fourth embodiment in which the narrow groove is formed as a circular arc shape, the braking performance on ice and the traction performance on ice therein are further improved than those in the tires in accordance with the first and second embodiments in which the narrow groove is formed as a straight line shape.

In the above embodiments, the sipe 20 is a straight sipe. However, the present invention is not limited to this sipe shape, and the sipe 20 may have the other shape which is conventionally known and the narrow groove (the large thickness portion of the sipe) can be freely combined with the sipe of the other shape. However, if the sipe 20 is formed as a shape having a large number of bent portions such as a zigzag shape, in the inclined narrow groove, resistance against a water flow within the groove becomes large.

Further, the sipe 20 ay be inclined with respect to the axial direction of the tire and may be formed on the land portion other than the block 18, for example, on the rib or the like.

Further, it is most preferable that the sipe 20 has both ends open to the side surface of the block 18, however, as far as the one end is open to the side surface of the block 18, the water discharge effect can be secured at a certain degree.

Still further, the sipe 20 ay be a flask sipe. More specifically, as shown in FIG. 21, an enlarged portion 30 having a flask shape may be provided in an end portion of the sipe 20 in a depth direction. In accordance with this, all of the removed water can be discharged to the side of the block 18 through the enlarged portion 30 so that the tire performance on ice can be further improved. As illustrated in FIG. 18, an end portion of the sipe within the block in the depth direction is an enlarged portion. Some of the smaller thickness portions of the sipe are connected only to the enlarged portion and do not open to the surface of the land portion or the sidewall. A depth of the enlarged portion is larger than a width of each of the large thickness portions.

Furthermore, a cross sectional shape and a size of the narrow groove 22 may be changed as the block 18 is worn and the groove may be structured such that a number thereof is increased (or decreased) as the block 18 is worn. Accordingly, a absorbing force of water is changed between an early stage of wear and a last stage of wear.

Moreover, a cross sectional shape of the narrow groove 22 may be another shape other than a rectangular shape and a half circular shape, for example, the trapezoidal shape, a triangular shape or the like, that is, it is sufficient for the cross sectional shape to have a low resistance against water. For example, the total shape of the large thickness portion may be formed as a substantially oval shape by forming the narrow groove 22 having a cross sectional shape of a half oval on the sipe side surface 20A and the sipe side surface 20B of the sipe 20 in the same direction.

As explained above, since the pneumatic tire in accordance with the first embodiment of the present invention is structured above, removal of water in the road contact surface is performed without lowering the other performances so that the first embodiment has an excellent effect such that high tire performance on ice can be obtained. Further, even if a number of the sipes is increased and the thickness of the sipe is made significantly thin in order to secure the block rigidity, a flow passage for removing the water film can be always secured because the thickness of the sipe is alternately changed between the large size and the small size.

Since the pneumatic tire in accordance with the second embodiment of the present invention is structured above, the removed water can be discharged in a straight way toward the bottom of the sipe so that the second embodiment has an excellent effect such that resistance at a time that the water flows through the large thickness portion can be limited to a low level.

Since the pneumatic tire in accordance with the third embodiment of the present invention is structured such that the large thickness portion of the sipe extends in a substantially circular arc manner toward the bottom of the sipe, an effect of discharging the water to the outside of the land portion is improved more than that extending in a substantially straight manner so that the performance for removing water can be improved. Accordingly, the third embodiment has an excellent effect such that the tire performance on ice can be further improved.

Since the pneumatic tire in accordance with the fourth embodiment of the present invention is structured such that the large thickness portion of the sipe is set to a range between 0.1 mm and 1.5 mm, the fourth embodiment has an excellent effect such that the water removal can be efficiently performed.

Since the pneumatic tire in accordance with the fifth embodiment of the present invention is structured such that the thickness of the small thickness portion of the sipe is set to a range between 10% and 80% of the thickness of the large thickness portion, the fifth embodiment has an excellent effect such that water removal can be efficiently performed and high tire performance on ice can be maintained.

Since the pneumatic tire in accordance with the sixth embodiment of the present invention is structured such that the total length of the large thickness portion of the sipe in the longitudinal direction of the sipe is set to a range between 20% and 80% of the total length of the sipe, the sixth embodiment has an excellent effect such that the water removal can be efficiently performed and the high tire performance on ice can be maintained.

Since the pneumatic tire in accordance with the seventh embodiment of the present invention is structured such that the sipe wall surfaces substantially opposing to each other of the large thickness portion are not brought into contact with each other in the road contact surface under the load application, the seventh embodiment has an excellent effect such that water can be certainly removed by the large thickness portion.

Since the pneumatic tire in accordance with the eighth embodiment of the present invention is structured such that the interval between the large thickness portions is set to a range between 0.1 mm and 5.0 mm, the eighth embodiment has an excellent effect such that water removal can be efficiently performed and the high tire performance on ice can be maintained.

Since the pneumatic tire in accordance with the ninth embodiment of the present invention is structured such that the first groove shaped recess portion and the second groove shaped recess portion are crossed to each other, the effect of discharging water to the outside of the land portion can be improved and the performance of removing water can be improved. Accordingly, the ninth embodiment has an excellent effect such that high tire performance on ice can be further improved.

Since the pneumatic tire in accordance with the tenth embodiment of the present invention is structured such that the enlarged portion having a flask shape is provided on the end portion of the sipe in the depth direction, the performance of removing the water can be further improved so that the tenth embodiment has an excellent effect such that tire performance on ice can be further improved.

In the pneumatic tire in accordance with the eleventh embodiment, since the sipe does not completely cross the land portion, deterioration of the rigidity of the land portion can be prevented so that the eleventh embodiment has an excellent effect such that generation of the unbalanced abrasion can be prevented. Further, this embodiment has an excellent effect such that the stress given to the other end of the sipe can be dispersed by the enlarged portion so that generation of the crack in the other end can be prevented.

In the pneumatic tire in accordance with the twelfth embodiment, the water absorbed by the enlarged portion provided in the other end portion of the sipe can be discharged out of the land portion through the enlarged portion provided in the bottom portion of the sipe.

While the embodiments of the present invention as herein disclosed constitute a preferred form, it is to be understood that other forms might be adopted.

What is claimed is:

1. A pneumatic tire having a tread comprising; a land portion having a sidewall and at least one sipe formed therein, wherein a thickness of the sipe is alternately changed between a large size which defines a large thickness portion and a small size which defines a smaller thickness portion along a longitudinal and depth direction of the sipe, wherein large thickness portions and the smaller thickness portions of the sipe run in two directions and are inclined with respect to a radial direction of the pneumatic tire from a central portion of a block such that large thickness portions at opposite sides of the central portion are inclined to extend away from one another along the depth-wise direction of the sipe, an end portion of the sipe within the block in the depth direction being an enlarged portion, and some of said smaller thickness portions of the sipe being connected only to said enlarged portion and not opening to the surface of said land portion or said sidewall, a depth of said enlarged portion is larger than a width of each of the large thickness portions.

2. A pneumatic tire as recited in claim 1, wherein the large thickness portion of said sipe extends substantially in a circular arc manner toward the bottom of the sipe.

3. A pneumatic tire as recited in claim 2, wherein a thickness of the large thickness portion of said sipe is set to a range between 0.1 mm and 1.5 mm.

4. A pneumatic tire as recited in claim 2, wherein a thickness of the small thickness portion of said sipe is set to a range between 10% and 80% of the thickness of the large thickness portion.

5. A pneumatic tire as recited in claim 2, wherein the small thickness portion of said sipe is structured such that under a state of contact to the road surface at a time of load application, wall surfaces of the sipe opposing to each other are substantially brought into contact with each other and the large thickness portion is structured such that under a state of contact to the road surface at a time of load application, wall surfaces of the sipe opposing to each other are not substantially brought into contact with each other.

6. A pneumatic tire as recited in claim 2, wherein an interval of the large thickness portions of said sipe is set to a range between 0.1 mm and 5.0 mm.

7. A pneumatic tire as recited in claim 2, wherein the large thickness portion of said sipe is structured by a first groove shaped recess portion formed on one sipe wall surface of said sipe and a second groove shaped recess portion formed on the other sipe wall surface, and said first groove shaped recess portion and said second groove shaped recess portion are cross to each other.

8. A pneumatic tire as recited in claim 1, wherein a thickness of the large thickness portion of said sipe is set to a range between 0.1 mm and 1.5 mm.

9. A pneumatic tire as recited in claim 1, wherein a thickness of the small thickness portion of said sipe is set to a range between 10% and 80% of the thickness of the large thickness portion.

10. A pneumatic tire as recited in claim 1, wherein the small thickness portion of said sipe is structured such that under a state of contact to the road surface at a time of load application, wall surfaces of the sipe opposing to each other are substantially brought into contact with each other and the large thickness portion is structured such that under a state of contact to the road surface at a time of load application, wall surfaces of the sipe opposing to each other are not substantially brought into contact with each other.

11. A pneumatic tire as recited in claim 1, wherein an interval of the large thickness portions of said sipe is set to a range between 0.1 mm and 5.0 mm.

12. A pneumatic tire as recited in claim 1, wherein the large thickness portion of said sipe is structured by a first groove shaped recess portion formed on one sipe wall surface of said sipe and a second groove shaped recess portion formed on the other sipe wall surface, and said first groove shaped recess portion and said second groove shaped recess portion are cross to each other.

13. A pneumatic tire as recited in claim 1, wherein said enlarged portion has shape of a flask.

14. A pneumatic tire as recited in claim 1, wherein said sipe has one end which opens to the side wall of the land portion and the other end which terminates within said land portion, said other end including an enlarged portion.

15. A pneumatic tire as recited in claim 14, wherein said end portion of said sipe is connected to the enlarged portion formed in the other end of said sipe.

\* \* \* \* \*